(12) United States Patent
Panagos et al.

(10) Patent No.: US 11,870,871 B2
(45) Date of Patent: *Jan. 9, 2024

(54) METHODS AND APPARATUS FOR SERVING CONTENT TO CUSTOMER DEVICES BASED ON DYNAMIC CONTENT POPULARITY

(71) Applicant: Time Warner Cable Enterprises LLC, St. Louis, MO (US)

(72) Inventors: Jamie Panagos, Denver, CO (US); Reuben Patterson, Denver, CO (US); Michael Mongillo, Boulder, CO (US); Justin Slaughter, Highlands Ranch, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 339 days.

This patent is subject to a terminal disclaimer.

(21) Appl. No.: 16/673,958

(22) Filed: Nov. 4, 2019

(65) Prior Publication Data

US 2020/0068036 A1 Feb. 27, 2020

Related U.S. Application Data

(63) Continuation of application No. 14/986,603, filed on Dec. 31, 2015, now Pat. No. 10,469,609.

(51) Int. Cl.
*H04L 67/568* (2022.01)
*H04L 67/563* (2022.01)
*H04L 67/5682* (2022.01)

(52) U.S. Cl.
CPC .......... *H04L 67/568* (2022.05); *H04L 67/563* (2022.05); *H04L 67/5682* (2022.05)

(58) Field of Classification Search
CPC ............ H04L 67/2842; H04L 67/2852; H04L 67/2814; H04L 67/1014; H04L 67/568; H04L 67/563; H04L 67/5682
See application file for complete search history.

(56) References Cited

U.S. PATENT DOCUMENTS

| 10,469,609 | B2* | 11/2019 | Panagos | H04L 67/2814 |
| 2003/0005035 | A1* | 1/2003 | Rodgers | G06F 16/958 |
| | | | | 709/219 |
| 2004/0073604 | A1* | 4/2004 | Moriya | G02F 1/13718 |
| | | | | 709/202 |

(Continued)

*Primary Examiner* — Nam T Tran
(74) *Attorney, Agent, or Firm* — Straub & Straub; Michael P. Straub; Stephen T. Straub

(57) ABSTRACT

Methods and apparatus for processing requests for content received from customer devices are described. A decision on how to respond to a request for content is made at an edge node based on a locally maintained popularity list. The local popularity list reflects the local popularity of individual pieces of content at the edge node. A white list of content to be cached and served irrespective of popularity is sometimes used in combination with the local popularity list to make decisions as to how to respond to individual requests for content. In some embodiments the edge node decides on one of the following responses to a content request: i) cache and serve the requested content; ii) serve but don't cache the requested content; or iii) redirect the content request to another node, e.g., an alternate serving node, which can respond to the content request.

19 Claims, 13 Drawing Sheets

(56) References Cited

U.S. PATENT DOCUMENTS

| | | | | |
|---|---|---|---|---|
| 2009/0254661 A1* | 10/2009 | Fullagar | ............ | H04N 21/25891 709/226 |
| 2013/0204961 A1* | 8/2013 | Fliam | .................... | G06F 3/0649 709/214 |
| 2014/0025841 A1* | 1/2014 | Li | ........................... | H04L 67/02 709/232 |
| 2014/0164547 A1* | 6/2014 | Fullagar | .............. | H04L 67/5681 709/213 |

* cited by examiner

| | 1202 ↓ | 1204 ↓ |
|---|---|---|
| 1200 ↪ | CONTENT IDENTIFIER | NON-LOCALLY DETERMINED POPULARITY LEVEL |
| 1210→ | TITLE 1 | 97 |
| 1212→ | TITLE 2 | 91 |
| 1214→ | TITLE 3 | 80 |
| 1216→ | TITLE 4 | 73 |
| 1218→ | TITLE 5 | 50 |
| 1220→ | TITLE 6 | 45 |
| 1222→ | TITLE 7 | 42 |
| 1224→ | TITLE 8 | 35 |
| ≈ | ⋮ | ⋮ |
| 1244→ | TITLE N-3 | 20 |
| 1246→ | TITLE N-2 | 17 |
| 1248→ | TITLE N-1 | 0 |
| 1250→ | TITLE N | 0 |

FIGURE 12

| | 1302 ↓ | 1304 ↓ | |
|---|---|---|---|
| 1300 ↪ | CONTENT IDENTIFIER | LOCALLY DETERMINED POPULARITY LEVEL | |
| 1310→ | TITLE 1 | 97 | |
| 1312→ | TITLE 2 | 91 | |
| 1314→ | TITLE 6 | 78 | |
| 1316→ | TITLE 4 | 73 | |
| 1318→ | TITLE 5 | 50 | - - $T_{SC}$ |
| 1320→ | TITLE 3 | 46 | |
| 1322→ | TITLE 7 | 42 | |
| 1324→ | TITLE 8 | 35 | |
| ≈ | ⋮ | ⋮ | |
| 1344→ | TITLE N-3 | 25 | |
| 1346→ | TITLE N-2 | 20 | - - $T_R$ |
| 1348→ | TITLE N-1 | 0 | |
| 1350→ | TITLE N | 0 | |

FIGURE 13

METHODS AND APPARATUS FOR SERVING CONTENT TO CUSTOMER DEVICES BASED ON DYNAMIC CONTENT POPULARITY

RELATED APPLICATIONS

The present application is a continuation of U.S. patent application Ser. No. 14/986,603, which was filed on Dec. 31, 2015 and which was published as U.S. Patent publication US 2017-0195447 A1on Jul. 6, 2017 and which is hereby expressly incorporated by reference in its entirety.

FIELD OF THE INVENTION

The present invention relates to methods and apparatus for serving content, e.g., audio, video, image and/or multimedia content, to customer devices from one or more network nodes based on the popularity of content.

BACKGROUND

With multiple devices via which the customers can now consume content, there has been an exponential increase in demand for a wider selection and formats of content that the customers want to be available for delivery. One of the implications of this ever growing demand for more content on the content serving network nodes is to store greater amount of content ready to be delivered to customers. In the current deployment many content delivery networks (CDNs) rely on edge nodes or the network nodes closest to a requesting customer to serve content to the requesting customer. Such an approach can become problematic as the number of services or content that can be served grows and the formats, bitrates and popularity of the content becomes more widely distributed among the viewers. The issue is complicated by the fact that while there is limited storage in the edge nodes to cache the content, still many edge nodes are burdened with storing both unpopular content requested by very few subscribers as well as popular content requested by many. While at first it may seem desirable to serve both popular and unpopular content cached in the edge nodes for quick delivery, storing and managing content with wide popularity differences can significantly lower the efficiency of the edge nodes.

In view of the above discussion, it would be desirable if popular and unpopular content could be dynamically identified and network nodes could be dynamically assigned to cache content based on the popularity of requested content. It should be appreciated that there is a need for methods and apparatus that facilitate dynamically determining content popularities and caching locally popular content to customers on edge nodes while not using local resources to cache less popular content.

SUMMARY OF THE INVENTION

Methods and apparatus for processing requests for content received from customer devices are described. The methods maybe used at e.g., edge nodes or other nodes used for caching and serving content. In various embodiments, a decision on how to respond to a request for content is based on a locally maintained popularity list which is maintained at the edge node which receives the requests for content. The local popularity list reflects the local popularity of individual pieces of content at the edge node. A white list of content to be cached and served from the edge node maybe and sometimes is used in combination with the local popularity list to make decisions as to how to respond to individual content requests.

The edge node in some embodiments basis the initial popularity for a piece of content on a general popularity list obtained from a control node which receives reports of the popularity of content at different edge nodes. The general popularity list, while serving as the initial basis for the local popularity list is updated in the edge node based on content requests received at the edge node and the updated list is used as a local popularity list for making content request response decisions. In this way, local caching and serving decisions are based on the local popularity at a given edge node which may differ from the average general popularity of a piece of content with respect to a region larger than that severed by the edge node. This facilitates efficient use of the local cache and facilitates providing quick responses to requests for locally popular content which may not be highly popular in the larger area on which the general popularity metrics are determined. For example, content corresponding to a local sports team might be highly popular at an edge node corresponding to the area in which the team plays but not in other geographic areas where the team maybe relatively unknown. The use of local popularity information at the edge node allows for such locally efficient content to be served in a manner that provides good service at the local level which might not be provided if only general popularity information was used.

The edge node, in some embodiments, decides on one of the following responses to a content request: i) cache and serve the requested content; ii) serve but don't cache the requested content; or iii) redirect the content request to another node, e.g., an alternate serving node, which can respond to the content request.

In some embodiments where a white list is used, if the requested content is on the white list the content will be served and cached irrespective of its popularity.

Use of a white list is optional and is not used in all embodiments. In embodiments where a white list is not used or in cases where a white list is used by the requested content is not on the white list, the popularity of the requested content on the local popularity list is used in determining what response is to be taken in response to request for content.

In one embodiment, if content which is not on a white list is above a serve but don't cache popularity threshold on the local popularity list of the edge node which received the request for content, the requested content will be cached and served. If the requested content is at or below the serve but don't cache threshold on the local popularity list and above a redirect threshold, the edge node will serve the requested content but not cache the requested content. If the requested content is at or below the redirect threshold on the local popularity list the edge node will respond to the content request by redirecting the request which may then be served the node to which the request is redirected, e.g., without further involvement of the edge node which redirected the request.

While the serve but don't cache threshold and redirect threshold maybe fixed, in some embodiments a cache efficiency metric is generated at the edge node. The cache efficiency metric may take one of several forms. In one embodiment it is a ratio of the percentage of content requests served by providing previously cached content to the percentage of content requests served by providing content which was not available from the cache and had to be obtained from another node in response to the content request or were redirected.

Content is loaded in a cache in response to content requests and replaces less popular content and/or older content as the cache runs out of space to store requested content for which a cache and serve decision is made. In some embodiments if the cache efficiency metric drops below a desired, e.g., predetermined or fixed threshold, one or both of the serve but don't cache threshold and redirect threshold are adjusted, e.g., changed, in an attempt to improve cache efficiency.

An alternative node to which content requests can be redirected can avoid some or all content redirection in a variety of ways. The alternate node can signal to the control node responsible for generating and distributing a white list that a particular piece of content should be added to the white list. Upon updating and distributing the white list content request for content added to the white list will no longer be subject to redirection and the alternate node will not have to service requests for the content added to the white list. Alternatively, the alternate node can updated content request redirection information used by one or more edge nodes in deciding where to redirect a particular received content request so that the edge node does not redirect content requests for all or particular pieces of content to the alternate server node seeking to avoid servicing all or particular content requests.

Modification of content redirection information by an alternate server node maybe implemented by the alternate server node or a control node in response to detecting loading above a desired level at the alternate server node or that the server node is or will be unavailable due to servicing or a fault condition.

Updates to the general popularity information maybe made over time and may reflect general popularity levels for content added to the system. The control node may supply the updated general popularity list to edge nodes which can then update their local popularity list to include content which was not previously available. Content removed from the general popularity list because it is no longer available may also be removed from local popularity lists by the edge node receiving an updated general popularity list.

In some embodiments general popularity lists and white list updates occur at a slower rate than local popularity list updates.

It should be appreciated that all features need not be used or included in all embodiments and that a wide variety of variations are possible. Various additional features and advantages of the present invention are discussed in the detailed description, which follows.

BRIEF DESCRIPTION OF THE DRAWINGS

FIG. 12 illustrates a general popularity list including a list of content and corresponding popularity information arranged according to the order of the listed content's popularity.

FIG. 13 illustrates a local popularity list and two thresholds which maybe maintained by an edge node and used in making decisions on how to respond to a content request received by an edge node.

DETAILED DESCRIPTION

Methods and apparatus for serving content from network nodes based on popularity conditions at such nodes, popularity of requested content and/or according to other implementation criteria, will now be described.

Figure 1:
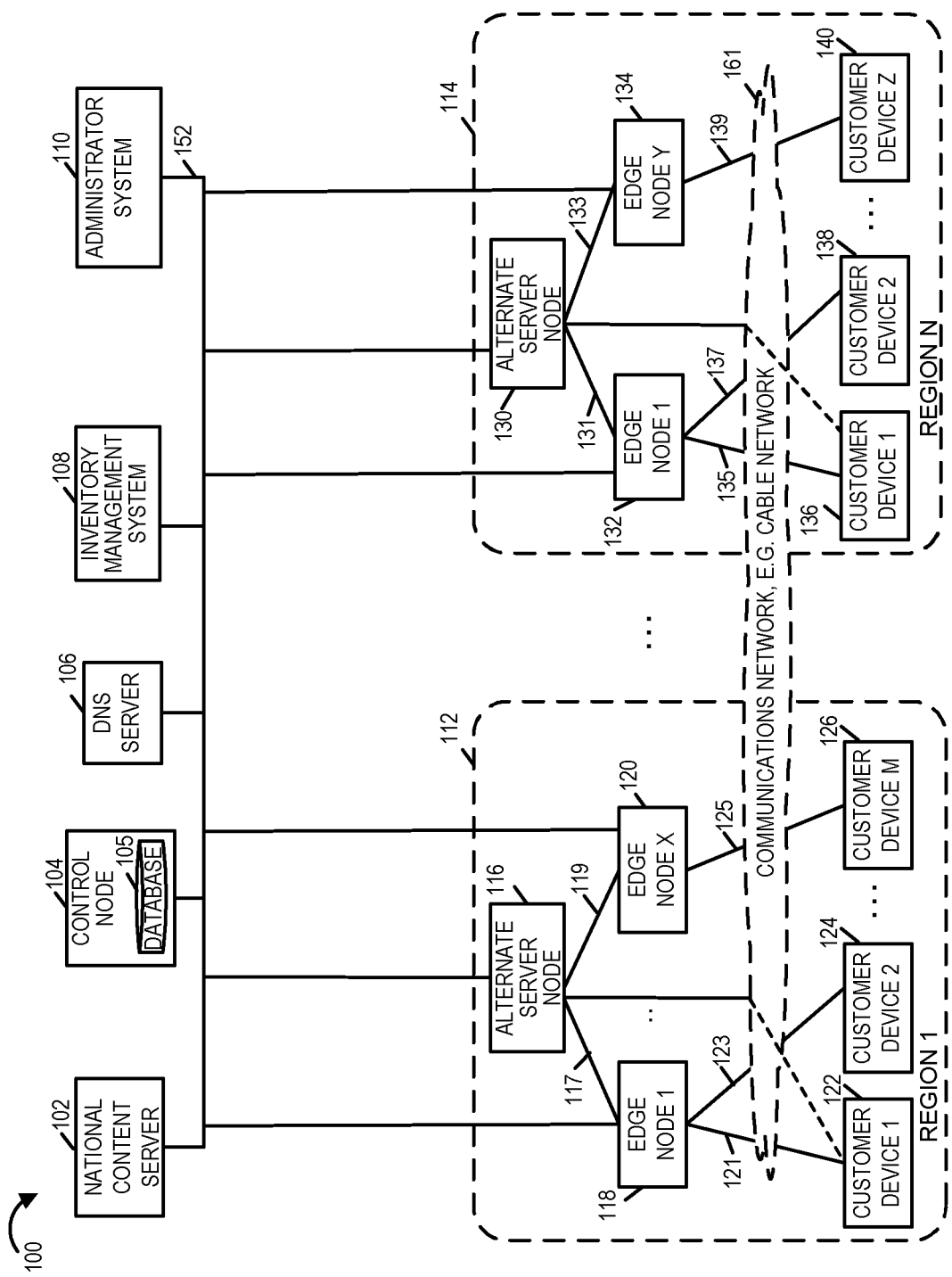
FIG. 1 illustrates an exemplary communications system implemented in accordance with the present invention.

FIG. 1 illustrates an exemplary content delivery and distribution system 100 implemented in accordance with the invention supporting content distribution. Shown in FIG. 1, are a plurality of regions, e.g., region 1 112 through region N 114, which form a part of the exemplary system 100. In addition to various elements and subsystems associated with regions 112, 114 which are discussed below, system 100 includes a national content server 102, a control node 104, a DNS server 106, an inventory management system 108 and an administrator system 110. The regions 112, 114 include one or more network head ends, e.g., regional service provider systems, which serve a corresponding set of customer premise devices, e.g., set top box (STB) devices and/or other content playback devices. As shown in the figure, each of the regions 112, 114 includes a number of network nodes 116, 130 (referred to as alternate server nodes) which are higher up in hierarchy than the edge nodes 118, 120, 132, 134. The alternate server nodes 116, 130 may be mid-tier and/or other nodes from the perspective of network hierarchy. The various elements of the system 100 including the national content server 102, control node 104, DNS server 106, administrator system 108, the inventory management system 110, the network nodes 116, 130 and the edge nodes 118, 120, 132, 134 are coupled via communications network/bus 152 over which they communicate and exchange information.

The national content server 102 has access to national content storage and may provide content to one or more network nodes for serving the customers locally within the region to which the network nodes correspond. In some embodiments the national content server 206 processes requests for content and accesses content from, e.g., a national content storage, in the event when a user requested content is not available locally to the user from the serving headend.

The control node 104 is responsible for gathering popularity information from various network nodes in the system including the edge nodes and alternative server nodes and may use it in generating popularity lists to be provided to these network nodes in accordance with the features of some embodiments. In some embodiments the control node 104 periodically polls various network nodes, e.g., edge nodes 118, 120, 132, 132 and/or alternative server nodes 116, 130 to send local content popularity information generated by these nodes. The local content popularity information or list includes a list of programming content ranked according to its popularity or demand in the given region. Since popularity of content may change with time, the network nodes generate and provide the local content popularity information on a regular basis, e.g., at predetermined time intervals. In some embodiments the network nodes, e.g., edge nodes and alternative server nodes, also provide historical logs including information regarding content requested by customers in a given time window, e.g., in previous 24 or 48 hours. Using the local content popularity information and historical logs reported by various local edge and alternative server nodes, the control node 104 generates global or national content popularity index database 105. Thus database 105 includes popularity information that has been ranked on a geographically granular basis indicating how popular various pieces of content (e.g., movies, songs, TV shows, game broadcasts) are at particular level of geographic granularity, e.g., at a global or national level, e.g., based on local content popularity lists and historical usage data received from edge and mid-tier nodes corresponding to different regions and/or popularity information obtained from the national content server 102. The global popularity information (also referred to as general popularity information) generated by the control node 104 is stored in the database 105 and is updated periodically to reflect the changing trends in content popularity. The control node 104 then uses this knowledge of global and local popularity of content to generate global popularity lists (also referred to as general popularity list) which is communicated to one or more edge nodes and/or alternate server nodes in accordance with the invention. Such a list provides popularity information at the global level or is based on popularity information on a global level. Content which is not popular, e.g., not popular at local level, should not be cached on the edge node and requests for unpopular content may be and sometimes are redirected to one or more other network nodes, e.g., such as alternate server nodes or served but not cached on the local edge node.

As should be appreciated in some embodiments the control node provides global popularity information which the local node can, and sometimes does, then process to make decisions as to whether content is unpopular. Content requests corresponding to unpopular content are then subject to redirection in some cases and serve but not cache operations in other cases. Domain name system (DNS) server 106 facilitates resolving an internet domain name to a corresponding address so that a device requesting content can be directed to the appropriate network entity that can serve the requested content. A content request includes a URL (uniform resource locator) that specifies the location of the piece of content being requested. A DNS server 106 resolves the hostname included in the URL to an address of the entity, e.g., a network node, which can potentially provide the content being requested.

The inventory management system 108 includes a complete inventory list of available content and the address of one or more entities, e.g., servers, network nodes etc., that can potentially serve or provide the content. The inventory management system 108 includes or has access to a database including information identifying a plurality of content items and the address/identification of source(s) from which the content items can be potentially obtained. For example the inventory management system 108 in some embodiments includes a full list of content items, as specified by content identifiers such as, for example, URLs corresponding to content items available to system 100 and the corresponding address/identity of the node/server being referenced in the URLs from which content items can be obtained. In some embodiments the control node requests information from the inventory management system 108 to identify available services, e.g., content, and the corresponding nodes from which the content can potentially be obtained. The control node uses such information to make decisions regarding no-cache directives on edge. With such information the control nodes can better determine which network nodes, e.g., alternate server nodes, should serve as redirection end points, that is, assigned the task to serve content to customers when content requests are redirected for fulfillment from an edge node.

The administrator system 110, among other things, is responsible for defining a list of content items that should always be served (and normally also locally cached) by the network nodes regardless of loading conditions and/or local popularities at a given network node, e.g., edge node. Such content items should be cached on the network node that receives request from one or more customer devices provided that the serving node is functional. Such a list of content items, which must be locally served and cached by the node receiving content request for such content without any redirections to other nodes/servers, is referred to as a white list. The white list content items may include content such as news content, sports content and/or other content from major broadcast network partners of the service provider. The white list may include content provided by content suppliers which require the service provider, e.g., due to contractual obligations to immediately serve their supplied content without redirections. The administrator system 110 keeps the white list updated and provides a current white list to various network nodes serving content in different regions to ensure that these nodes do not redirect requests for content included in the white list for fulfillment to other nodes/servers. Furthermore while a network node, e.g., edge node, is allowed to change local popularities corresponding to content items in a local popularity list based on change in local popularity of content, the edge node is forbidden from removing content items listed in the white list from a local popularity list.

Referring now to the regions 112, 114 shown in FIG. 1. The network nodes such as the alternate server nodes and edge nodes shown as being included in each of the respective region 1 112 and region N 114 may be part of respective network headends corresponding to these regions. Region 1 includes an alternate server node 116 and a plurality of edge nodes including edge node 1 118, ..., and edge node X 120. The edge nodes 118 through 120 locally store a variety of content, e.g., received from the national content server 102, and serve content via communications network 161 to one or more customer devices in region 1 112 including customer device 1 122, customer device 2 124, ..., and customer device M 126. In some embodiments the alternate server node 116 can also serve content via communications network 161 to the one or more customer devices 122, 124, ..., 126 in region 1 112, e.g., in case of redirections, edge node break downs and/or other scenarios. The communications network 161 can, and in some embodiments is, implemented as a cable network. Communications links 121, 123, ..., 125 traversing the communications network 161 couple customer devices 122, 124, ..., 126 respectively to the edge nodes 118, 120. The customer devices in region 1 112 are also communicatively coupled to the alternate server node 116 and/or other network nodes.

Similarly region N includes an alternate server node 130 and a plurality of edge nodes including edge node 1 132, ..., and edge node Y 134. The edge nodes 132 through 134 locally store a variety of content and serve content via the communications network 161 to the corresponding set of customer devices in region N 114 including customer device 1 136, customer device 2 138, ..., and customer device Z 140. Communications links 135, 137, ..., 139 traversing the communications network 161 couple customer devices 136, 138, ..., 140 respectively to the edge nodes 132, 134. While not shown in the figure the customer devices in region N 114 are also communicatively coupled to the alternate server node 130 and/or other network nodes. While only a single alternate server node is shown in each region 112, 114 for simplicity it should be appreciated that a plurality of alternate server nodes may be included and/or correspond to each region.

Figure 2:
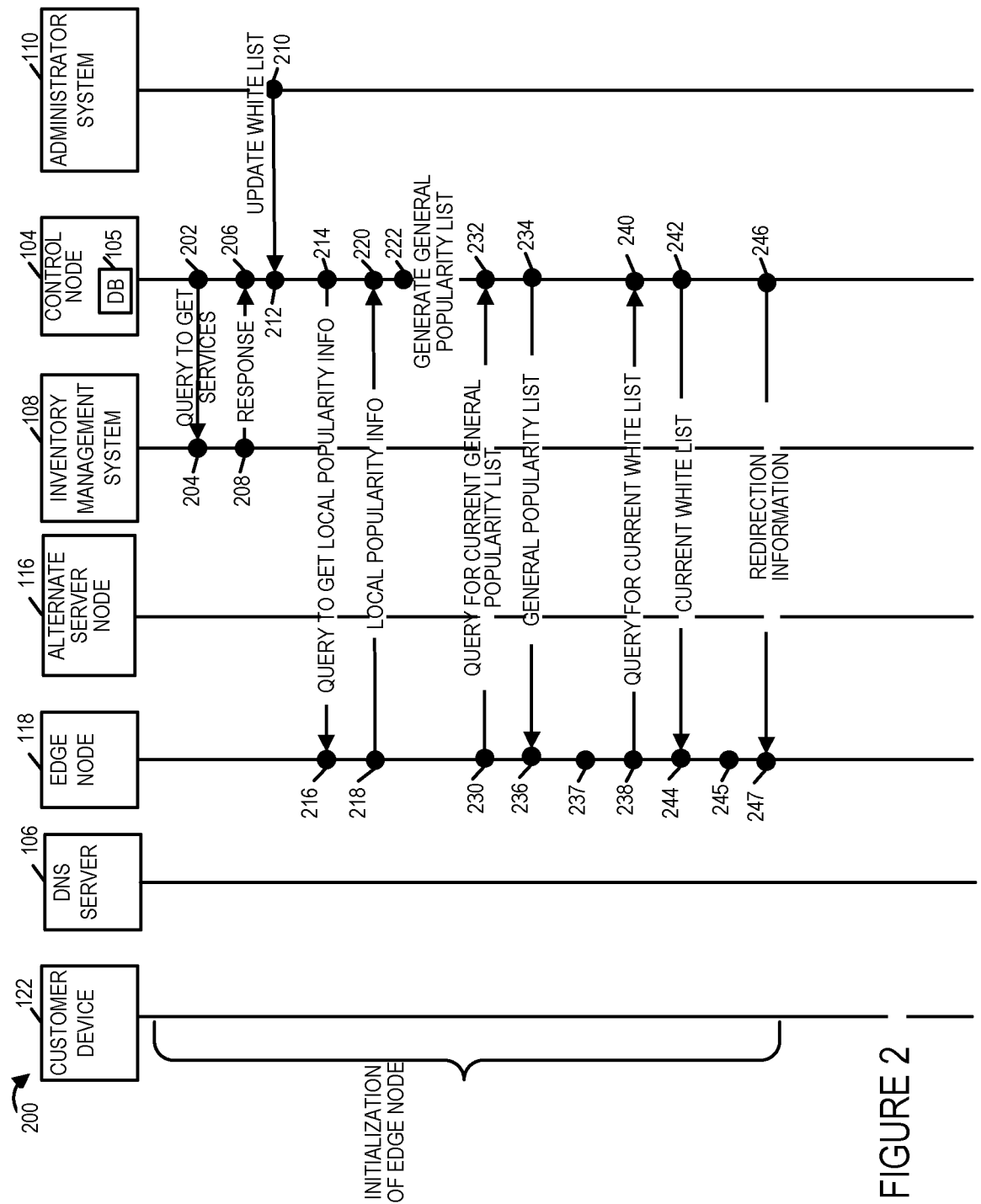
FIG. 2 illustrates the signaling and steps associated with initializing the exemplary system to prepare an edge node to service requests for content.

An exemplary process will now be discussed in detail with regard to the example shown in FIG. 2. Elements of the system 100 shown in FIG. 1 which participate in the method being described in the FIG. 2 example are shown at the top of FIG. 2 and bear the same reference numbers as used in FIG. 1. Messages, information, content and/or signals communicated between devices are represented in FIG. 2 using arrows.

At the top of FIG. 2, various elements 200 of the system 100 which may participate in the exemplary method in accordance with one embodiment of the invention, are shown. The illustrated elements 200 include customer device 122, DNS server 106, edge node 118, mid-tier node 116, inventory management system 108, control node 104 and the administrator system 110. For the purposes of discussion consider that the customer device 122 is an IP (Internet Protocol) capable device capable of receiving content over IP.

While the redirection features maybe dynamically enabled/disabled based on sensed load, the edge node could alternatively be controlled to implement the redirection features or not based on a static setting or command which maybe communicated to the edge node, e.g., by a system administrator. As shown, FIG. 2 illustrates the steps and associated signaling used in one exemplary embodiment where at some point loading at the edge node 118 exceeds a threshold level and in accordance with the features of the invention one or more content requests from customer devices are then redirected to the mid-tier node 116 for fulfillment. In various embodiments even when the loading reaches the threshold level the edge node may still serve locally popular content from the edge node but not cache content determined to be unpopular. Thus the storage space being occupied for content which is locally unpopular at the edge node can be freed for additional, popular content.

In the illustrated example, the process starts with the control node 104 sending a request for services to the inventory management system 108. The request for services from the control node 104 is a request to get information regarding available content, e.g., a list of content items, identifiers, e.g., URLs, corresponding to content items available to system 100. The control node 104 may use this information to generate an exemplary redirection list. As part of the redirection list the control node may include appropriate information in the redirection list regarding sources which can potentially provide content. The inventory management system 108 receives the request in step 204. In step 206 the inventory management system 108 sends a response to the control node 104 with the requested information, which is received and processed by the control node 104 in step 208 to retrieve the information.

In step 210 the administrator system 110 queries the control node 104 to update the white list, e.g., which may be the last updated version of white list in the possession of the control node 104. The administrator system 110 further provides information to update the white list, e.g., information indicating one or more content items to be added to removed from a previous version of white list. The control node 104 receives the query and update information in step 212. In step 214 the control node 104 sends a request to the mid-tier node 116 to get local popularity information generated by the mid-tier node. The mid-tier node 116 receives the request in step 216 and in step 218 responds with the requested local popularity information, e.g., a list indicating locally determined popularity of content at the mid-tier node 116. The control node 104 receives the local popularity information from the mid-tier node 116 in step 220. Steps 214' through 220' are similar to steps 214 through 220 with local popularity information being requested in step 214' from the edge node 118. The edge node 118 in step 218' responds with the requested local popularity information, e.g., a list indicating locally determined popularity of content at the edge node 118. In some embodiments the local popularity information is generated by various network nodes serving content in various regions and periodically sent to the control node. In some other embodiments the network nodes generate and provide the local popularity information to the control node in response to a request.

In step 222 the edge node 118 requests a current redirection list and/or popularity information, e.g., non-locally determined popularity, from the control node 104. The control node 104 receives the request in step 224. Further in step 224 the control node 104 generates a current popularity and/or list for the requesting edge node 118 using the information in the database 105, e.g., inventory item list, updated white list, historical logs and local popularity information received from various network nodes. In some embodiments the control node 104 also takes into consideration the physical location of the edge node 118 in region 112 and location of other alternative nodes, e.g., mid-tier or other network nodes, which can be used to serve/fulfill content requests redirected from the edge node 118. In step 226 the control node 104 sends the generated list to the edge node 118. The edge node receives the popularity and/or redirection list in step 228. In step 230 the edge node 118 requests a current white list from the control node 104. The control node 104 receives and processes the request in step 232. In step 234 the control node 104 sends the current white list to the edge node 118.

At some point in time, in step 240, a customer device 122 seeks to obtain content, e.g., selecting a content item, e.g., a show, from a displayed program guide using a URL corresponding to the content being sought. A resolution request seeking resolution of a URL is sent to a DNS server for resolution. The DNS server 106 in step 242 receives the request to resolve the URL. The DNS server 106 resolves the request and in step 244 provides an IP address corresponding to the edge node 118 to be contacted to obtain the requested content. The customer device 122 receives the DNS server provided resolution with information in step 246. In step 248 the customer device 122 using the received address sends the content request, e.g., as a HTTP GET, to the edge node 118. The edge node receives the content request from the customer device 122 in step 250. In some embodiments in step 252 the edge node 118 which is monitoring its loading conditions checks its load level and determines that the loading is above a threshold level. The checking of load level is optional and not performed in all embodiments. In embodiments where load level is not check, operation maybe based on whether the edge device is configured to support popularity based redirection decisions or not. Further in step 250 the edge node 118 checks if the requested content is included in the current white list. If the requested content is included in the white list the edge node 118 has to serve the content locally and cache the content. In such a case the content request will not be redirected. The edge node also checks a locally generated local popularity list to determine if the requested content is locally popular beyond a minimum threshold. If the local popularity of requested content is high, e.g., beyond a predetermined local threshold level below which content is considered locally unpopular, the edge node 118 serves and caches the content locally. In the illustrated example it is considered that the request content is neither included in the white list nor the local popularity is above the threshold level. The edge node checks the current redirection list to check if the requested content is listed in the redirection list falls in relation to other content. If the requested content is found to be below the line, e.g., popularity threshold resulting in the content being determined to be "unpopular", a decision is made at the edge node 118, assuming the requested content is not on the white list, to not cache the content request and in some cases to redirect the request to another node, e.g., a mid-tier node 116, for fulfillment. The edge node 118 checks the information on content request servicing ability to determine which other network node(s) can be used for redirection purposes. In some embodiments redirection information may include more than one other node that can serve the requested content upon redirection from the edge node 118. In some embodiments the system uses HTTP Redirection response codes (e.g., a HTTP 302 or HTTP 303) for redirecting requests made to one tier to another higher tier node of the system 100.

In step 252 the edge node 118 generates and sends a HTTP 302 or HTTP 303 response message to the customer device 122. In some embodiments where the edge node replies with an HTTP 302, steps 256 through 262 are performed. In some other embodiments where the edge node replies with an HTTP 303, steps 264 through 278 are performed. The signaling arrows corresponding to steps 264 through 278 are shown using broken lines to illustrate that they are optional. Thus steps and signaling corresponding to one of the two approaches may be used for redirection.

Consider first the case where the edge node 118 in step 252 replies with an HTTP 302 (temporarily moved). The customer device receives and processes the received HTTP 302 in step 254. The HTTP 302 includes instruction for the client to get the content from other the node and provides a URL in the Location header field. The customer device 122 receives the HTTP 302 in step 254 and understands that it is to send the request, e.g., HTTP GET, to the new URL specified in the Location field. The customer device may, and normally will, send a new resolution request to resolve the new URL to be used and the DNS may resolve the new URL to a mid-tier node. In the illustrated example the URL specified in the Location field corresponds to the mid-tier node 116. Accordingly in step 256 the customer device 122 sends the content request as an HTTP GET to the mid-tier node 116. The mid-tier node 116 receives and processes the request in step 258. In response to the received request the mid-tier node 116 in step 260 sends HTTP 200 to the customer device 122 providing the requested content.

Now consider the other case where the edge node 118 in step 252 replies with an HTTP 303 (see other). The customer device receives and processes the received HTTP 303 in step 254. The HTTP 303 includes instruction for the client to perform another GET using the URI (uniform resource indicator) provided in the Location header field which in this case corresponds to the mid-tier node 116. The customer device 122 receives the HTTP 303 in step 254 and understands that it is to make the request, e.g., HTTP GET, using the new URI specified in the Location field. Accordingly in step 264 the customer device 122 sends the content request as an HTTP GET to the mid-tier node 116. The mid-tier node 116 receives and processes the request in step 266. In response to the received request the mid-tier node 116 in step 268 sends HTTP 200 to the customer device 122 providing the requested content. The customer device starts receiving content in step 270.

Steps 270 through 280 show additional processing steps and signaling which may be performed during system operation in some embodiments. If at some point in time during operation the loading at the mid-tier node 116 exceeds a threshold limit, e.g., due to increase in the number of devices being served caused by redirections from one or more other network nodes, the mid-tier node 116 may request opt-out and be removed from the list of redirection information as an alternative source of one or more content items. Furthermore the mid-tier node 116 may also opt-out and be removed from the set of redirection information due to other reasons such as fault detection, scheduled maintenance etc. Alternatively, to prevent redirection the mid-tier node may request that content be removed from a redirection list or treated as being white listed by one or more edge nodes to prevent future redirection. One such example is discussed with regard to steps 270 through 280 where the mid-tier node 116 requests removal from the of content from a redirection list or treatment of content as being popular on a popularity list, e.g., due to one or more of the above discussed reasons.

FIG. 2 is a diagram 200 illustrating the steps and signaling associated with initializing various components, including an edge node which 118, which responds to content requests, e.g., streams content or redirects a received content request, in the exemplary system shown in FIG. 1. In FIG. 2 and the subsequent drawings, the same reference numerals are used in different figures to identify steps which are the same or similar.

In FIG. 2, the components of the system are shown at the top of the figure with horizontal arrows being used to show the communication of messages, information or content between elements. Dots are used to represent steps or operations with the order of operations progressing from the top to towards the bottom of the figure showing an example order in which the steps maybe be performed. Similar illustrations are used in other figures to explain the invention. While the order of steps shown is used in some embodiments, the particular sequence is not intended to be limiting and one or more of the steps can be performed in another order particularly where the steps do not depend on information or messaging which is retrieved or communicated in another step. Thus, while the order of steps shown in FIG. 2 and the other figures is used in some embodiments it is not necessarily the only order in which the steps can be performed.

As shown at the top of FIG. 2, the system includes the customer device 122 which maybe, e.g., a set top box (STB) or other playback device which maybe and sometimes is located at a customer The system also includes DNS server 106, an edge node 118, an alternate server node 116, an inventory management system 108 a control node 104 and an administrator system 110.

Operation of the method shown in FIG. 2 begins in step 202 with the control node 104 sending a query to inventory management system 108 to obtain a list of content which maybe requested and supplied to one or more customer premises devices. In the FIG. 2 example, the query to obtain content information is in the form of a services query with the providing of a piece of content being a service. The inventory management system receives the query in step 204 and then responds to the control node 104 in step 208. The control node 104 receives in response to the service query, a list of services including the content which maybe supplied as part of the services. Thus the response received by the control node in step 206 includes a list of content, e.g., a list of all content which maybe supplied by a device in the system. The control node 206 generates a content list based on the information included in the response received in step 206. Thus control node 104 generates a list of all content available in the system as part of step 206 in some embodiments.

In step 210 the administrator system 110 generates a white list and communicates the white list to the control node 104. The white list maybe generated based on information manually entered into the administrator system by an administrator. The white list includes content which should be served and cached from edge nodes irrespective of the popularity of the content. Thus, the white list can be used to override popularity related decisions and maybe used, e.g., in cases where content is to be supplied with low latency and/or other reasons. For example, in the case where a sporting event is being especially promoted, the content corresponding to the event maybe added to the white list to make sure that requests for the content are served without delay due that might be otherwise occur if the content had to be obtained from another node. Thus, an administrator can override popularity based caching decisions which would normally be used by making changing to the white list. The white list can also be used to prevent redirection in cases where the alternative sever maybe undergoing service, excessive loading or other conditions which make redirection undesirable. As will be discussed below, an alternate server can, in some embodiments, signal the control node and/or administrator node and indicate that one or more titles, e.g., pieces of content, should be added to the white to prevent redirection of requests for the content to be added to the white list.

In step 212 the control node receives the white list and uses the updated information, e.g., updated white list, as the white list which should be supplied to edge nodes. The white list maybe supplied to the edge nodes in response to requests for the list from the edge nodes or pushed to the edge nodes with waiting for an update request. The white list received in step 212 is stored, e.g., in memory, in the control node 104 so that it can be supplied to other devices as needed or when an update is to be pushed to the nodes 118. Thus the edge nodes can be supplied with a list of content which is to be cached and served irrespective of the popularity of the content on the white list.

In step 214, the control node queries the edge nodes for popularity information, e.g., information on content requests which have been received, e.g., in a given time period. The queries for such information may occur at periodic intervals. Alternatively the edge nodes may send popularity information to the control node on a periodic or other basis. In response to the query, in step 220 the control node receives the popularity information from the edge node 118. The control node also queries and receives popularity information from other edge nodes. Thus steps 214, 222 are performed for multiple different edge nodes.

In step 222, the control node uses the popularity information obtained from multiple edge nodes to generate aggregated popularity information where the aggregation is of information received from multiple different edge nodes. For each piece of content that was reported as being requested by one or more edge nodes a popularity metric, e.g., popularity score in the form of a numerical value, is generated. The score maybe and sometime is based on the number of requests received for a piece of content in a predetermined time interval. Content which was not requested maybe given a popularity score of 0 while content which was requested at one or more edge nodes is given a higher score. Thus in step 222 a general popularity list is generated with a popularity score for each piece of content which maybe requested, e.g., a separate score for each piece of content which the control node knows can be requested in the system based on the information obtained from the inventory management system 108.

The general popularity list is updated over time as different edge nodes provide popularity information. The reporting and updating of the general popularity information generally occurs at periodic intervals, e.g., every 5 minutes or over longer intervals to allow for the collection and aggregation of popularity information from multiple edge nodes. The local popularity information at an edge node maybe, and sometimes is, updated by the edge node at intervals which are shorter than the intervals between the general popularity updates. Thus the local edge nodes may, and sometimes due, update local popularity information based on received content requests more frequently than the control node updates the general popularity information.

The control node may and sometimes does receive updated content availability information which is also used in updating the general popularity list. For example if new content becomes available the control node may receive information about the content availability and add the content to the general popularity list, e.g., with a popularity rating of zero if it has not been requested by any users.

In step 230 the edge node, e.g., as part of an initialization operation, queries the control node for the current general popularity list. The query is received by the control node in step 232. The control node 104 responds to the query by sending the current general popularity list to the edge node 118 from which the request for the popularity list was received. The edge node uses the general popularity list as a starting point for a local popularity list if it does not already have one. If the edge node 118 already has a local popularity list and a general popularity list is received with additional content listed which is not included in the edge nodes local popularity list the edge node 118 updates the local popularity list by adding the content in the general popularity list not already in the local list to the local popularity list and uses the general popularity for the content as the initial popularity value in the local list for the content added to the local list. Over time the popularity metric associated with an individual piece of content will be updated locally with the edge node using its local popularity list for serving, caching and redirection decisions.

In step 234 the control node responds to the request for the general popularity list by sending the most current general popularity list to the requesting edge node 118. Then in step 237 the edge node which receives the list uses the general popularity list to initialize or update its local popularity list. In the case of initialization, e.g., at start up, the edge node 118 adopts the received general popularity list as its initial local popularity list which it then updates as part of its normal update process based on requests for content received at the edge node 118. In the case of updating of an existing local popularity list, the edge node 118 adds content entries not present in the local popularity list, e.g., because the content was not previously available, and uses the popularity metric from the general popularity list for a piece of content added to the local list, as the initial popularity value for the piece of content being added. Over time the popularity metric will be updated based on local information, e.g., requests for the piece of content, if any, that are received.

In addition to requesting and obtaining the general popularity list, the edge node 118, in step 238, sends a query to the control node 104 for the current white list. In step 240 the control node receives the request for the white list and responds in step 242 by sending the current white list to the edge node 118. The edge node receives the white list in step 244 and stores it in memory. Content on the white list will be cached and served by the edge node irrespective of its popularity. The control node may push, e.g., send, and updated white list to the edge node periodically and/or in response to requests form the edge node 118. The edge node stores the received white list in step 245 and will use the current white list in making serve, cache and/or redirect decisions in response to received requests for content.

In addition to white list information the control node may and sometimes does provide the edge node 118 with redirection information. In sep 246 the control node sends redirection information to be used by the edge node 118 in the event the edge node decides to redirect a content request for a specific piece of content. The redirection information is received and stored in the edge node 118 in step 247.

In some embodiments the set of redirection information is a table of URL's with each URL corresponding to a piece of content which maybe requested and subject to a redirection operation. Thus when the edge node 118 receives a request for content and determines that it should be redirected, the edge node 118 accesses the redirection information using an indentified of the requested content as a lookup into the set of redirection information to retrieve the corresponding alternative URL. In some cases the alternative URL will resolve to an address of the alternate server node 116 or another node. Thus, in some embodiments redirection information in the form of an alternative URL is stored on a per piece of content basis and used for redirecting a request for the specific corresponding piece of content.

Figure 3A:
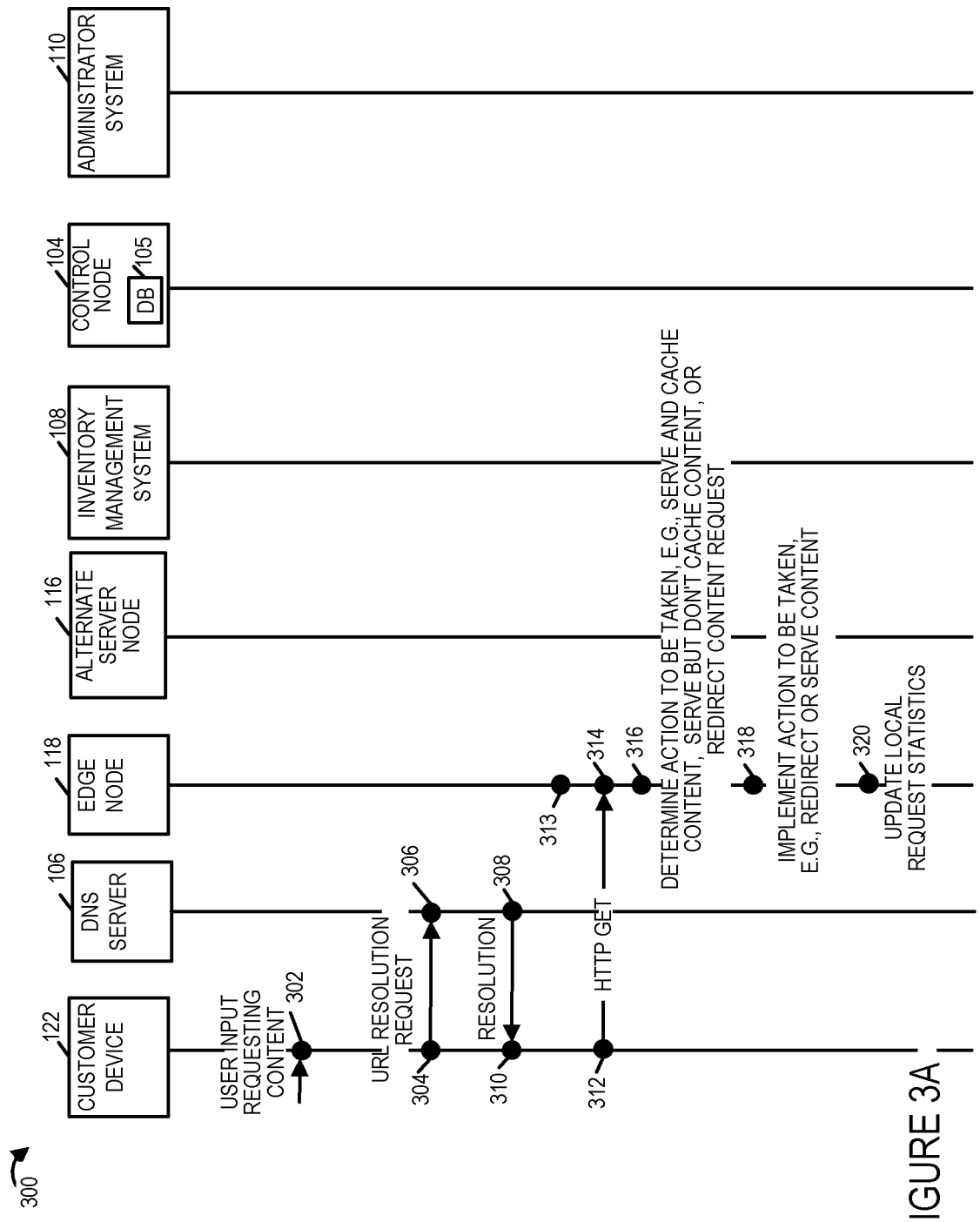
FIG. 3A illustrates an exemplary method of operating a network node, e.g., an edge node, in accordance with an exemplary embodiment, to receive, process and respond to requests for content.

After the edge node 118 or edge nodes in the system have been initialized, e.g., using the method shown in FIG. 2, the edge node 118 includes a white list, a local popularity list with content listed, e.g., ranked, according to popularity and redirection information. At this point the edge node 118 is ready to service requests FIG. 3 shows the steps of a method 300 including the issuing of a content request by a content playback device 122 and servicing of the content request as performed in some embodiments. By the time the method 300 is performed the edge node 118 will normally have been initialized as shown in FIG. 2.

In step 302 the customer playback device 122 which maybe a set top box, TV, DVR or another device receives user input requesting content. The customer device issues in step 304 a URL resolution request for resolution of a URL corresponding to the requested content. The request is sent to DNS server 106 which resolves the content related URL to an IP address which can be used to contact a device which can service a content request for the content corresponding to the URL. Thus, in such an embodiment the URL serves as a content identifier and corresponds, e.g., maps, to the user requested piece of content.

In step 306 the DNS server receives the URL which is sent as part of a resolution request and then in 308 sends a response to the resolution request to the requesting device 122. The resolution request response includes an IP address which can be used to contact a device, e.g., edge node 118, capable of servicing the content request. In step 310 the resolution response message is received and then in step 312 the customer device 122 issues a get message which is sent to the IP address returned in the resolution request. The get message is a content request including a content identifier, e.g., URL or another identifier, corresponding to the requested content. The edge node 118 receives the content request in step 314 and then in step 316 determines what action to be taken in response to the content request.

In at least some embodiments, the edge node 118 response to the content request by implementing one of 3 different responses: 1) serve and cache the requested content; 2) serve but don't cache the requested content or 3) redirect the content request so that another device will be responsible for servicing the content request.

Figure 3B:
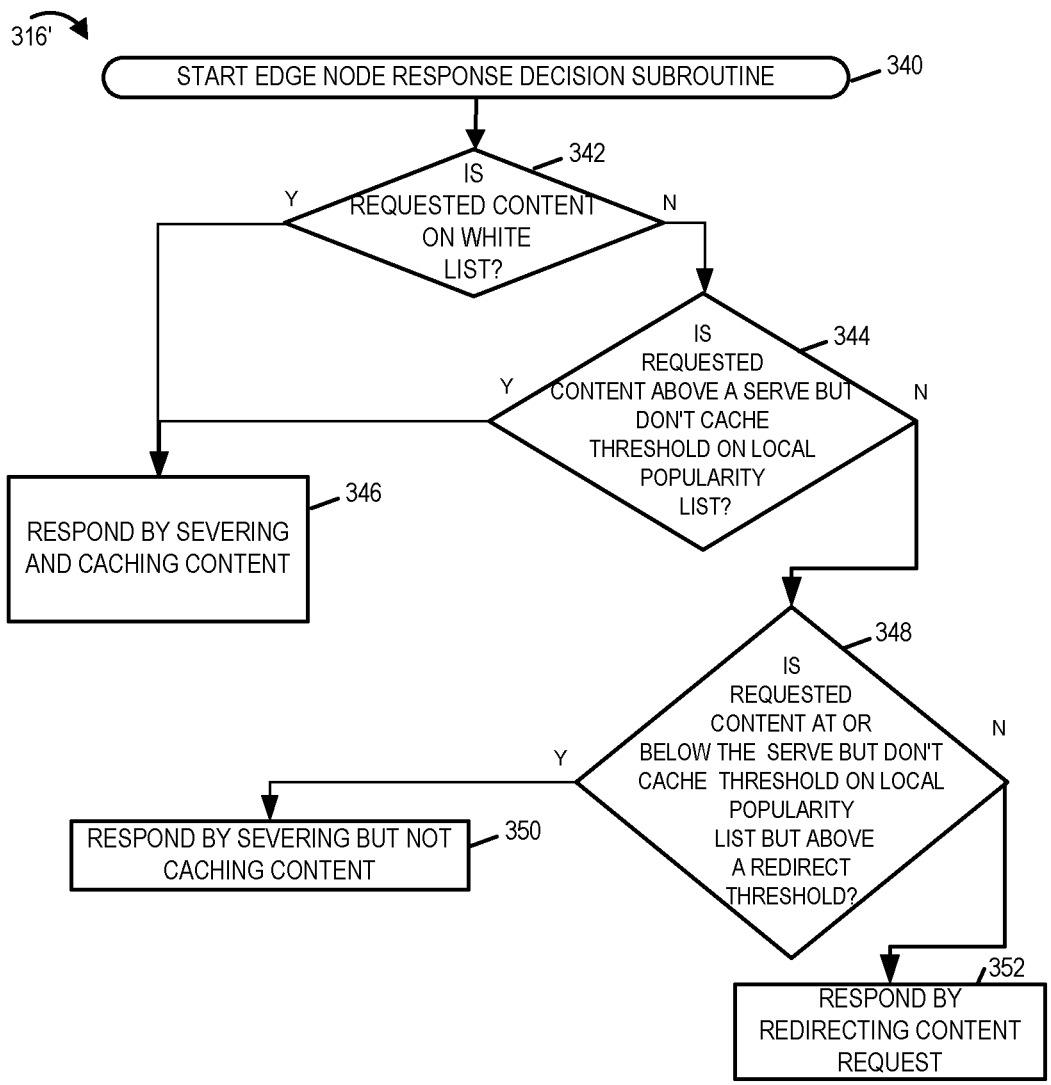
FIG. 3B illustrates the steps of a content request response decision subroutine that may be used in the method shown in FIG. 3A to decide what action to take in response to a received content request.

Decision step 316 maybe implemented by a call to a response determination subroutine which determines which of the 3 response to implement based on a white list and/or the local popularity list. FIG. 3B shows an exemplary response determination subroutine identified as 316' since it shows a set of substeps which maybe used to implement step 316

The subroutine 316' starts in step 340. The in step 342 a determination is made as to whether the requested content is on the white list in the edge node 118. If the requested content is on the white list the determination in step 346 is that the edge node should respond by serving and caching the requested content. If in step 342 it is determined that the requested content is not on the white list, operation proceeds to step 344 and the local popularity list is used in deciding what action is to be taken.

In step 344 the location of the requested content on the local popularity list is checked and if it is above a serve but don't cache threshold on the local popularity list the content will be served and cached because of its popularity as indicated by the yes output of step 344 proceeding to step 346. However if in step 344 it is determined that the requested content is not above the serve but don't cache threshold operation proceeds to step 348.

In step 348 a determination is made as to whether the requested content is at or below the serve but don't cache threshold on the local popularity list but above a redirect threshold. If the content is at or below the serve but don't cache threshold and above the redirect threshold, operation proceeds to step 350 where the decision is made to respond by serving the content but not caching the requested content.

If in step 348 it is determined that the requested content is not above the redirect threshold on the popularity list, operation will proceed to step 352 where the decision will be to redirect the content request so that it is served by a node other than the edge node 118. The redirection maybe to a node such as alternate server node 116.

Thus, if content is on the white list it will be served and cached. If the requested content is not on the white list but is popular as reflected by the content being above the serve but don't cache threshold, the content will be served and cached. If the requested content is at or below the serve but don't cached threshold and above the redirect threshold the requested content is marginally popular and will be served but not cached. If the requested content is locally unpopular as indicated by the requested content appearing on the local popularity list of the edge node 118 at or below the redirect threshold level, the content request will be redirected. Thus in step 316 the action to be taken in response to the received content request is made.

Referring once again to FIG. 3A operation proceeds from decision step 316 to action step 318 wherein the content request response decision made in step 316 is implemented. That is, the content request is redirected or the content is served. In the case where content is served the content will or will not be cached depending on whether the decision was to serve and cache or serve without caching.

In step 320 local request statics are updated. These statistics are used in some embodiments to update the local popularity information based on the number of content requests received in a given time period. The local statistics that are updated in step 320 may also include statics on the portion of the served content requests which were served from content that was already present in the edge node content cache at the time the content request was received. This information is used in some embodiments as a measure of cache efficiency with the ratio of content requests requiring content retrieval from another node to content requests which could served from content in the cache being a measure of cache efficiency. If cache efficiency drops below a desired level, the thresholds used to make the serve but don't cache decision maybe and sometimes is adjusted in an attempt to improve content efficiency.

Figure 4:
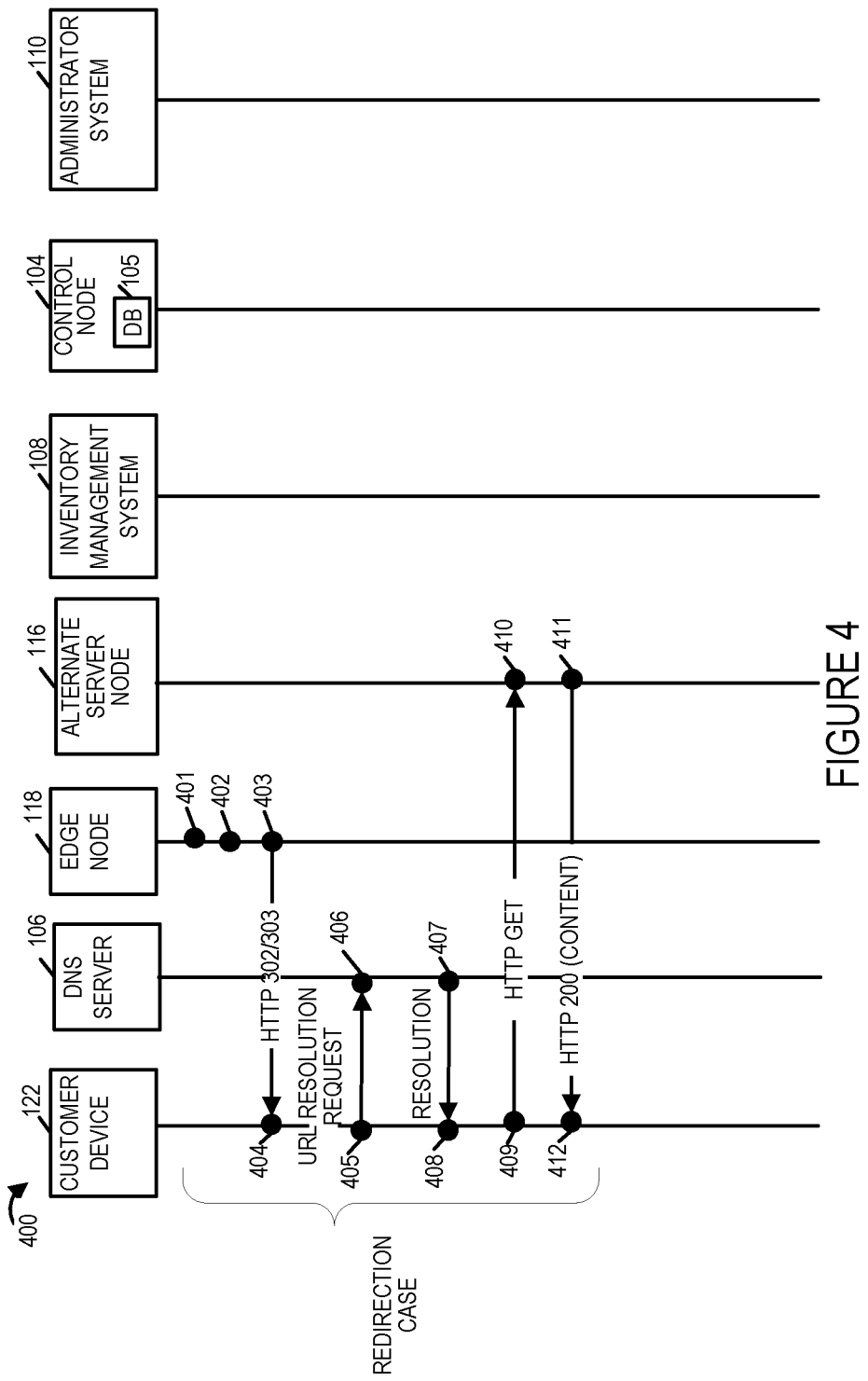
FIG. 4 is a flow and signaling diagram showing steps and signaling which are used in the exemplary system of FIG. 1 when the edge node decides to redirect a content request.

Having discussed the general processes of responding to a content request with respect to FIG. 3, a content request redirection method 400 will now be discussed with reference to FIG. 4. The steps of FIG. 4 are performed in some embodiments as part of implement decision step 318 when the decision by the edge node 118 is to redirect a content request.

The content redirection operation starts in step 401 and process to step 402 in which an alternative content source is determined. That is, an alternative URL corresponding to the requested content is determined by looking up the URL of the content request in the set of content request redirection information stored in the edge node 118. The alternative URL to be used in the content request determined by the lookup operation is then included in a content redirection message which is generated and sent in step 403.

The customer device receives the content request redirection message in step 404 and then in step 405 performs a new DNS lookup to resolve the URL provided in the content request redirection message. In step 406 the DNS server receives the URL resolution request and response in step 407 by providing an IP address corresponding to the alternate server node 116. In step 408 the customer device receives the resolution information and then in step 409 sends a new content request to using the IP address of the alternate server node 116. The content request is received by the alternate server 116 in step 410 and then in step 411 the alternate server 116 provides the requested content to the customer device 122.

Figure 5:
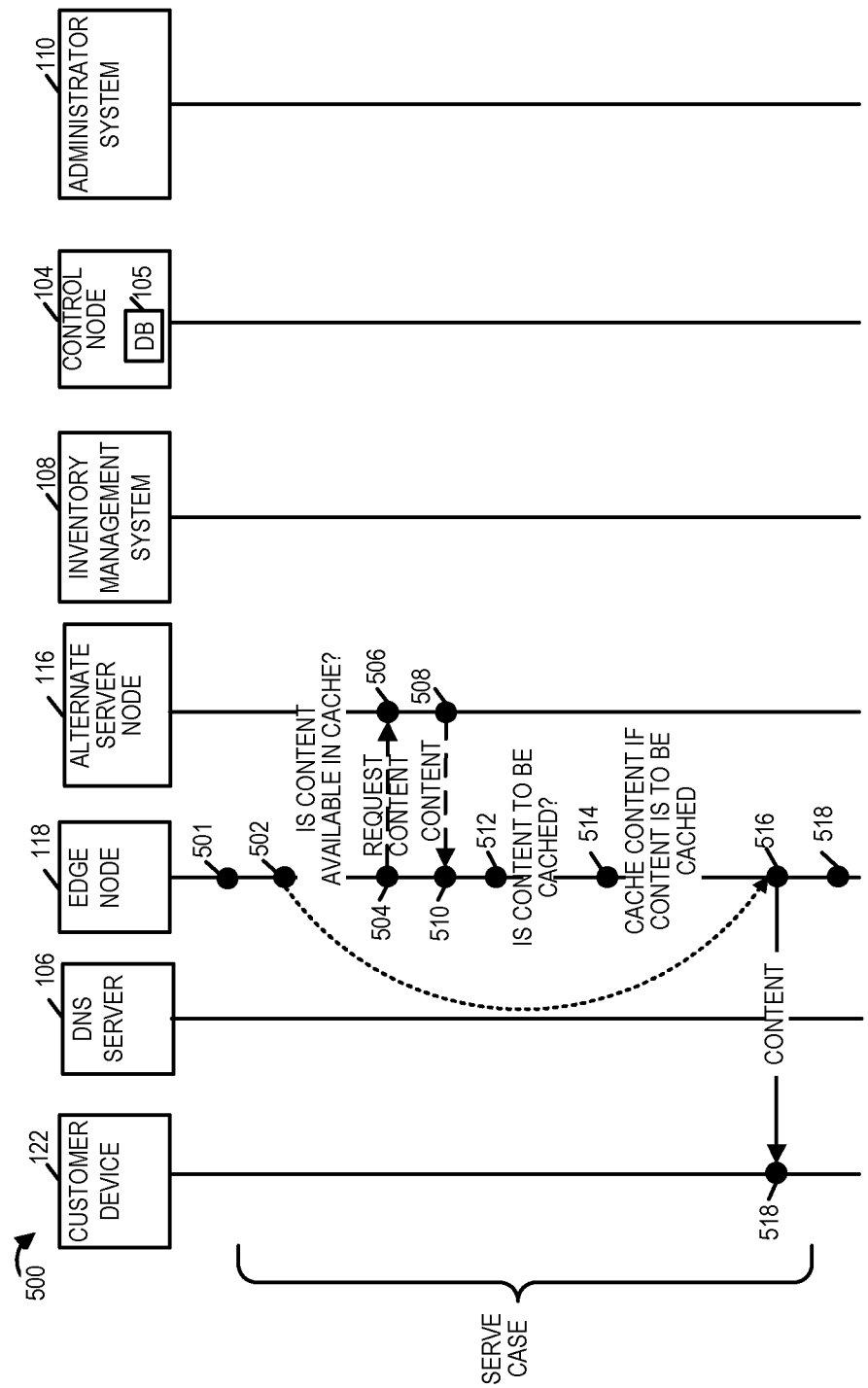
FIG. 5 is a flow and signaling diagram showing steps and signaling which are used in the exemplary system of FIG. 1 when the edge node decides to either i) serve and cache content in response to a content request or ii) serve but not cache content in response to a content request.

FIG. 5 illustrates the steps of a method 500 performed in step 318 when the decision is to serve content, e.g., with or without caching depending on the popularity of the requested content. The method 500 starts in step 501 and proceeds to step 502 in which a determination is made as to whether the requested content is already available in the edge node's content cache. If in step 502 it is determined that the content to be served is available in the cache, operation proceeds to step 516 and the requested content is served.

However, if the content not is not available from the cache, a request for content is sent in step 504 to another node, e.g., the alternate server node 116, which can supply the content to the edge node 118. In step 506 the alternate server node 116 receives the request for content and then in step 508 responds to the request by supplying the content to the edge node 118. In step 510 the edge node receives the requested content and then in step 512 determines if the content is to be cached.

If the decision was to respond to the content request and cache the content, then in step 512 the edge node determines that the content is to be cached and operation proceeds to step 514 where the content is stored in the edge nodes cache for future use before proceeding to serving step 516. If in step 512 it is determined that the content is not to be cached, e.g., because the decision with how to respond to the content request was a serve but do not cache response decision, operation proceeds from step 512 to step 516 skipping cache step 514. Thus the requested content may or may not be cached even though it will be served in step 516.

In step 518, e.g., after serving the requested content, serving statistics are updated. The serving statistics indicate, for example, the served content was served using already cached content or that the requested content had to be retrieved prior to serving. Thus, the edge node can determinate a ratio of the number of requests which were served using content that was retrieved from anther device as part of serving the content request to the number of content requests served using pre-stored content from the edge nodes cache. This ratio in some embodiments is used as a cache efficiency metric. As will be discussed below, if the cache efficiency metric falls below a desired threshold, the serve but do not cache threshold maybe and sometime is changed, e.g., up or down, in an attempt to improve cache efficacy and achieve at least the desired threshold level of cache efficacy.

Step 520 is a return step and is included in FIG. 500 to indicate that after serving of content and the updating of the serving statistics operation continues with the system receiving and responding to additional content requests.

Figure 6:
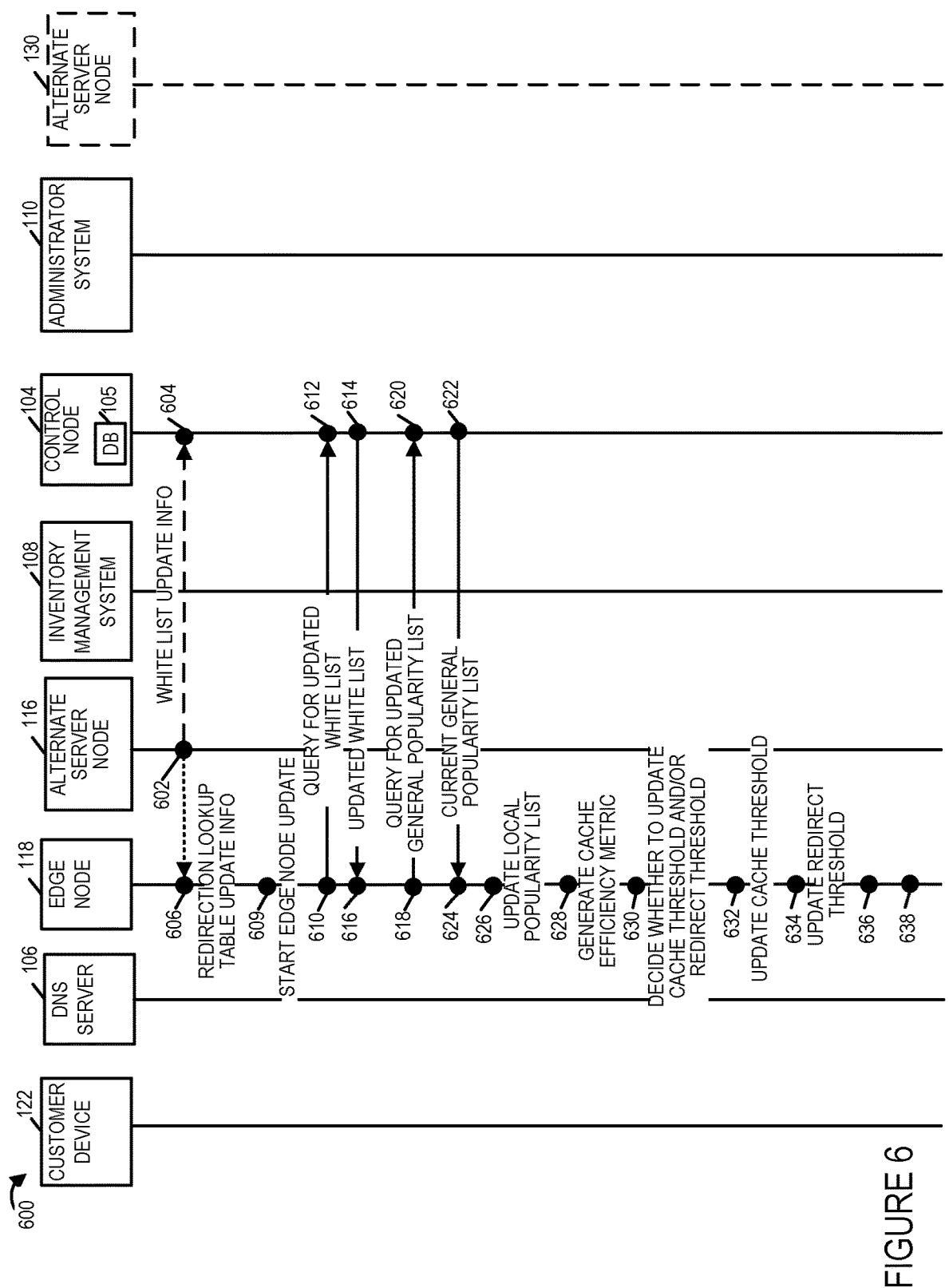
FIG. 6 is a flow and signaling diagram illustrating updating of various information in the system of FIG. 1 including, for example, white list information, general popularity list information, local popularity list information and one or more thresholds and other information.

FIG. 6 is a flow and signaling diagram illustrating updating of various information in the system of FIG. 1 including, for example, white list information, general popularity list information, local popularity list information and one or more thresholds and other information. The updating may and in some embodiments does occur periodically. While receipt of the updated popularity list and updating of the local popularity list is shown in sequential order, it should be appreciated that the local popularity list may and in some embodiments, updated multiple times for each time the general popularity list is updated. The most recent available information and lists is used in each update but as should be appreciated since the local edge node can and does update its local content popularity list more frequently than it receives general popularity lists the local popularity list maybe updated several time between updates involving use of a new or updated general popularity list. For example, the general popularity list maybe updated and supplied to edge nodes at 15 minute intervals while the local popularity list maybe updated every 5 minutes using the most recent information available which in many cases will not involve use of a new general popularity list.

The update process 600 shown in FIG. 6 begins with the alternate server node 116 issuing a white list or redirection information update. This is shown to illustrate that such an operation maybe optional be performed but the method maybe implemented without such an operation or with such an update being performed asynchronously with the other update operations.

In step 116 the alternate server node, or another control entity such as control node 104, determines that the alternate server node should no longer be used as an alternate server for serving one or more pieces of content and that redirection to the alternate server should be stopped for those one or more pieces of content. The decision to stop redirection to the alternate server for one or more pieces of content maybe due to the load on the alternate server 116 or because the alternate server is scheduled to be serviced and will be removed from operation during the service. In response to determining that the alternate server should not be used for redirection purposes for one or more pieces of content, the device, e.g., alternate server, making the decision to stop redirection either sends a message to the control node 104 to indicate that content that was being redirected should be added to the white list and thus will stop being redirected. The receipt of the white list upate by the control node 104 occurs in step 604 which also involves updating of the white list at the control based on the received message. The updated white list is then sent out later, e.g., in step 614.

As an alternative to updating the white list to stop redirection, the alternate server 116 or another node such as the control node can send a redirection lookup information update to the edge node 118 which was performing redirections to indicate that the alternate server should no longer be used for redirection of content requests corresponding to the one or more pieces of content the server 116 no longer wants to handle. The message sent in step 602 is received by the edge node 118 in step 606 and used to update the edge nodes redirection information. The update received in step 606 may include an alternate URL to be used for redirecting one or more pieces of content which will result in redirected content requests going to another alternate server 130 rather than alternate server 116.

An edge node may periodically or for other reasons implement an edge node update process. The edge node update is started in step 609, e.g., in response to an edge node update timer expiring. In step 610 the edge node 118 then sends a query for an updated white list to the control node 104 which receives the request in step 612. In step 614 the control node sends it the most recent white list, e.g. and updated white list, which the edge node receives and stores in step 616. the in step 618 the edge node 118 sends the control node 104 a request for an updated general popularity list. The control node 104 receives the request for an updated general popularity list and send the requested list to the edge node in step 620. The edge node receives the most recent general popularity list in step 624 and then updates its local popularity list in step 626 adding new content to its local popularity list and using the indicated popularity on the general list as the initial popularity of the new content on the local list.

In step 628 the edge node 118 generates a cache efficiency metric. The metric is an indication as to how efficient the edge node is using its cache. The metric maybe a ratio of the number of content requests served from content already stored in the edge node's cache without having to retrieve the content from another node in response to the request to the total number of content requests which were served. Other measures of cache efficiency may also be used. Local serving statistics maybe use to generate the cache efficiency metric.

In step 630 a decision is made as to whether to update one or more of the popularity thresholds, e.g., a serve and cache threshold or the redirect threshold. For example, if a predetermined cache efficiency is not achieved, the decision in step 630 maybe to update the serve and cache threshold used to determine which content is served and cached and below which content will not be cached. While the serve and cache threshold maybe lowered e.g., to increase the chance that content requests will result in caching of content, if this does not improve cache efficiency during the next adjustment it may be raised above where it was previously in an attempt to improve cache efficiency. Thus over time the thresholds used with respect the local popularity list for making cache determinations maybe adjusted until cache efficiency achieves a minimum desired efficiency level or the cache efficiency metric is optimized indicating maximization of cache usage.

If in step 630 the decision is to update a cache threshold, e.g., a serve and cache popularity threshold above which content will be served and cached, the threshold is updated in step 632 and if the decision is to update the redirect threshold the redirect threshold is updated in step 634.

Step 636 is a wait where waiting is implemented so that the current update interval, e.g., 5 minute interval, expires before the next update is implemented. In step 636 the update routine is called again and restarts in step 609 once the update increment interval time times out. Thus updates can be and in some embodiments are performed on a periodic basis.

Figure 7:
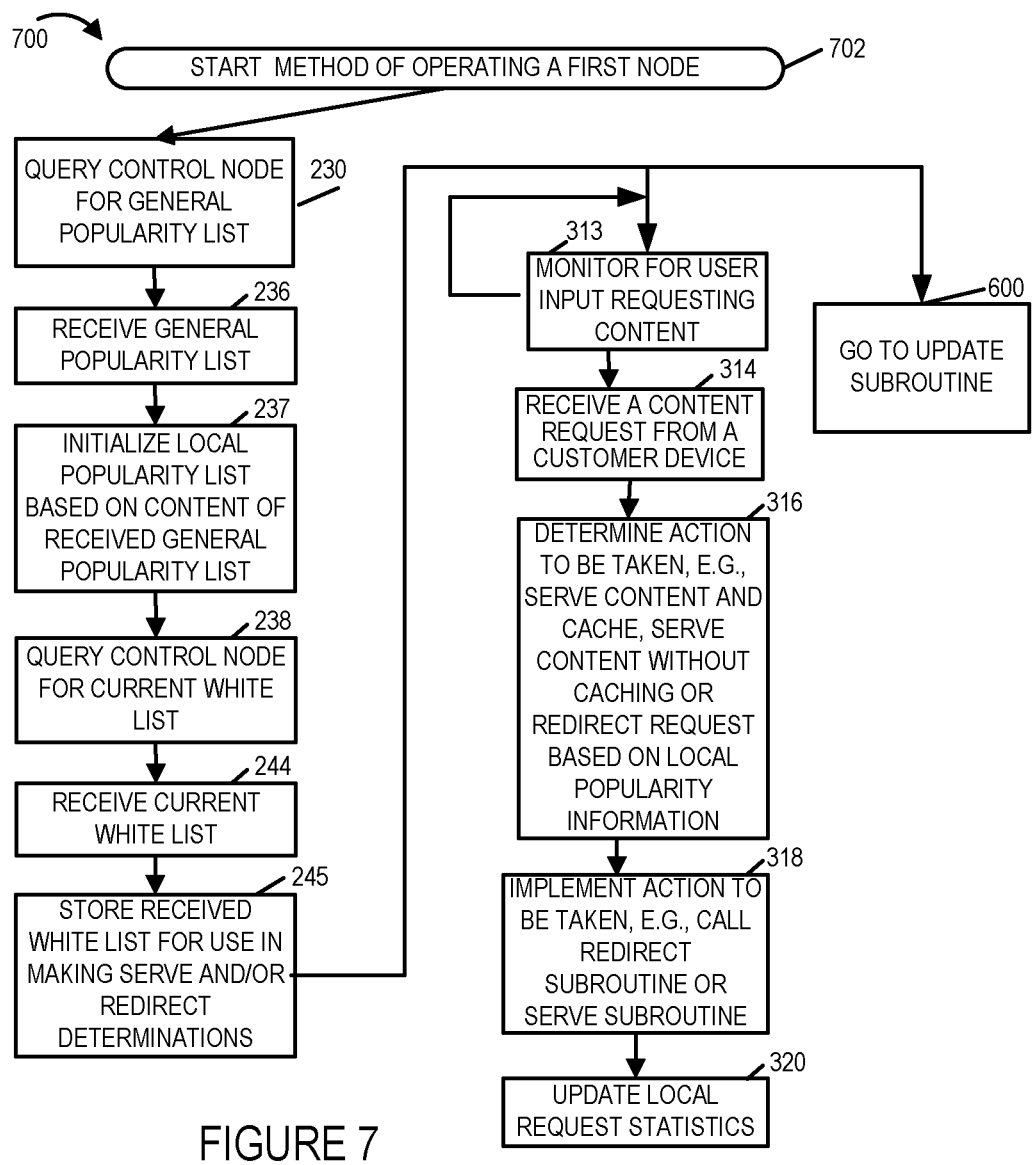
FIG. 7 shows steps of operating an edge node in accordance with the invention.

FIG. 7 shows steps of operating an edge node, e.g., edge node 118 in accordance with the invention. Many of the steps shown in FIG. 7 have already been described and are identified using the same reference numbers as used in the other figures to identify the same step. The method 700 shown in FIG. 7 begins with edge node 118 starting operation in step 702, being inatilaed in steps 230 through 245, monitoring for content requests and servicing such requests in steps 213 through 320 and a call to the update routine 600 being made in step 600. As should be appreciated the servicing of content request and updating of information in the edge node including the local popularity list may occur on an ongoing basis with content requests being services as they are received and updates occurring at periodic intervals or in response to received control signals.

Figure 8:
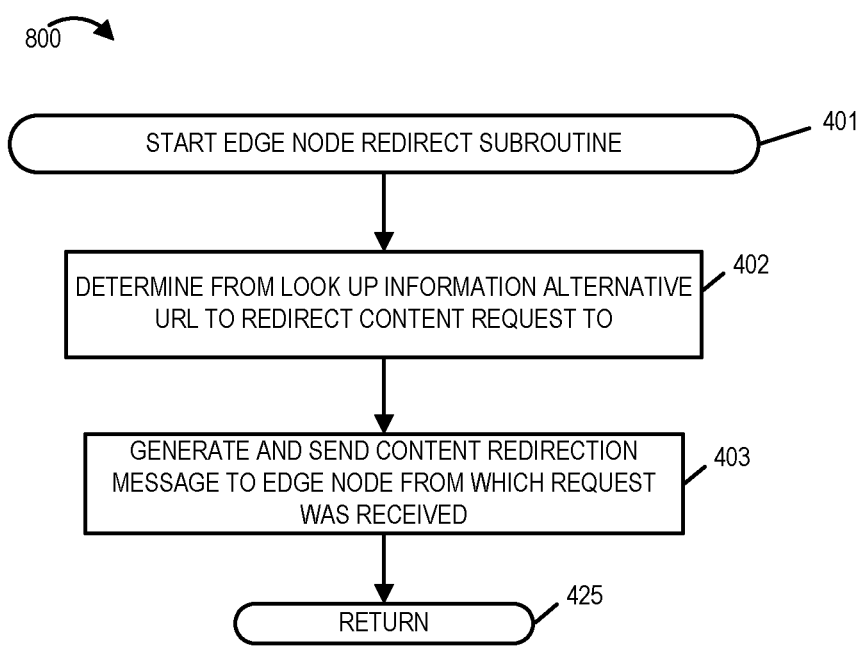
FIG. 8 illustrates the steps of a redirection subroutine implemented by an edge node when a decision is made to respond to a content request by implementing a redirection operation.

FIG. 8 illustrates the steps of a redirection subroutine 800 implemented by an edge node 118 when a decision is made to respond to a content request by implementing a redirection operation. The steps shown in FIG. 8 have already been described during the discussion of previous figures and thus will not be discussed further.

Figure 9:
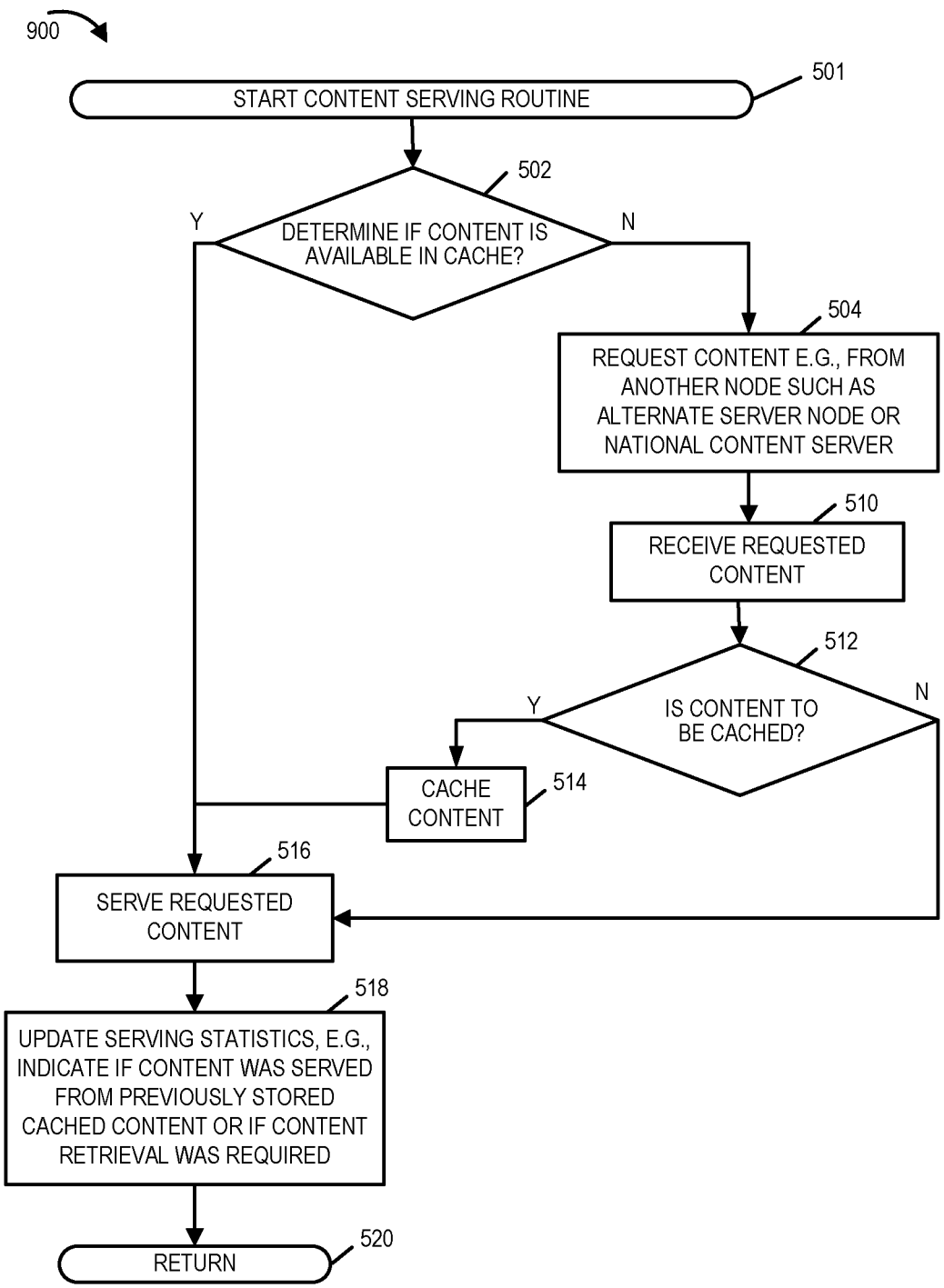
FIG. 9 shows the steps of a content serving routine implemented by an edge node when a decision is made to respond to a content request by serving and caching content or by serving content without caching the content.

FIG. 9 shows the steps of a content serving routine 900 implemented by an edge node when a decision is made to respond to a content request by serving and caching content or by serving content without caching the content. The steps shown in FIG. 8 have already been described during the discussion of previous figures and thus will not be discussed further.

Figure 10:
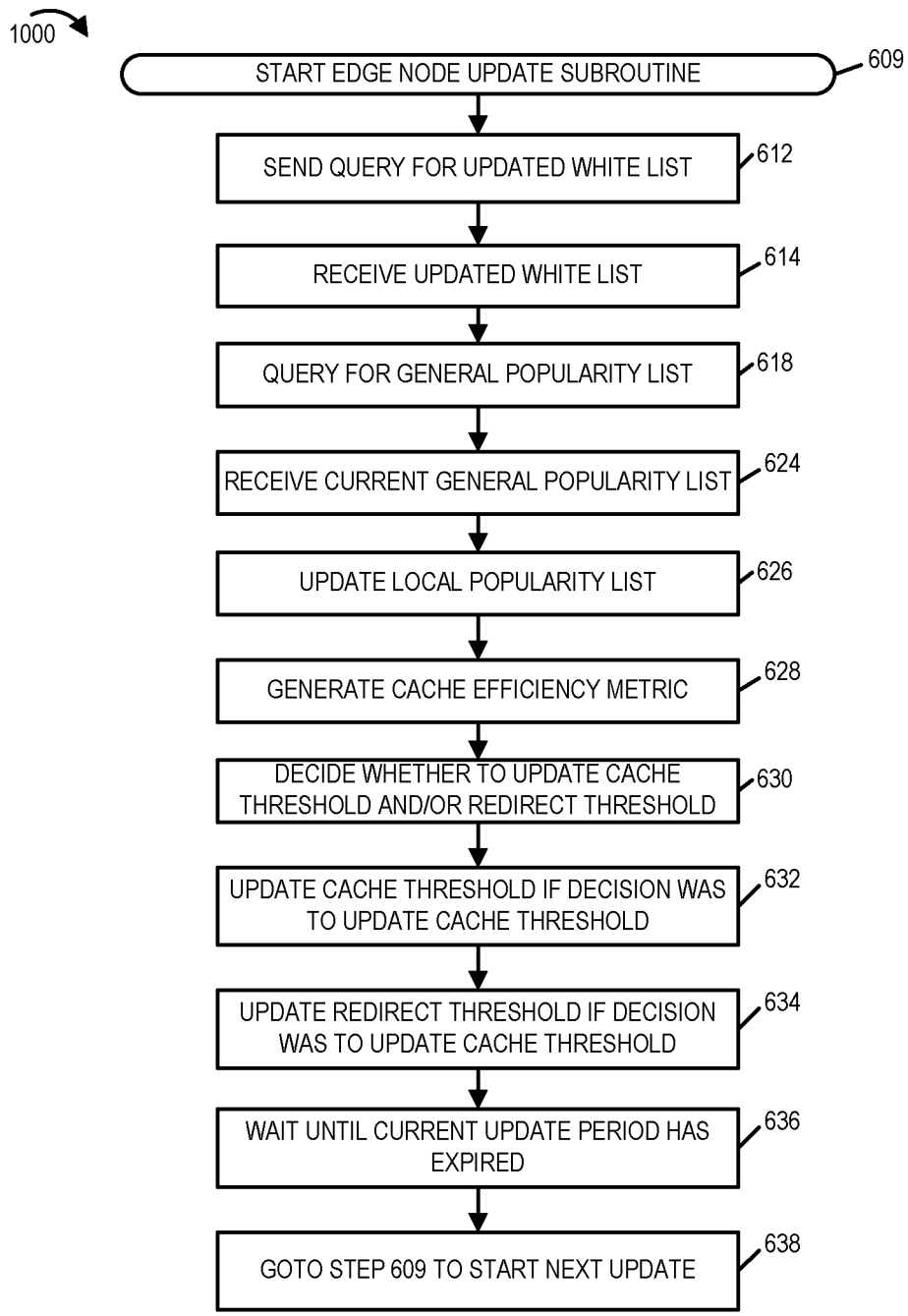
FIG. 10 shows the steps of an edge node update subroutine.

FIG. 10 shows the steps of an edge node update subroutine implemented by the edge node 118. The steps shown in FIG. 8 have already been described during the discussion of previous figures and thus will not be discussed further.

Figure 11:
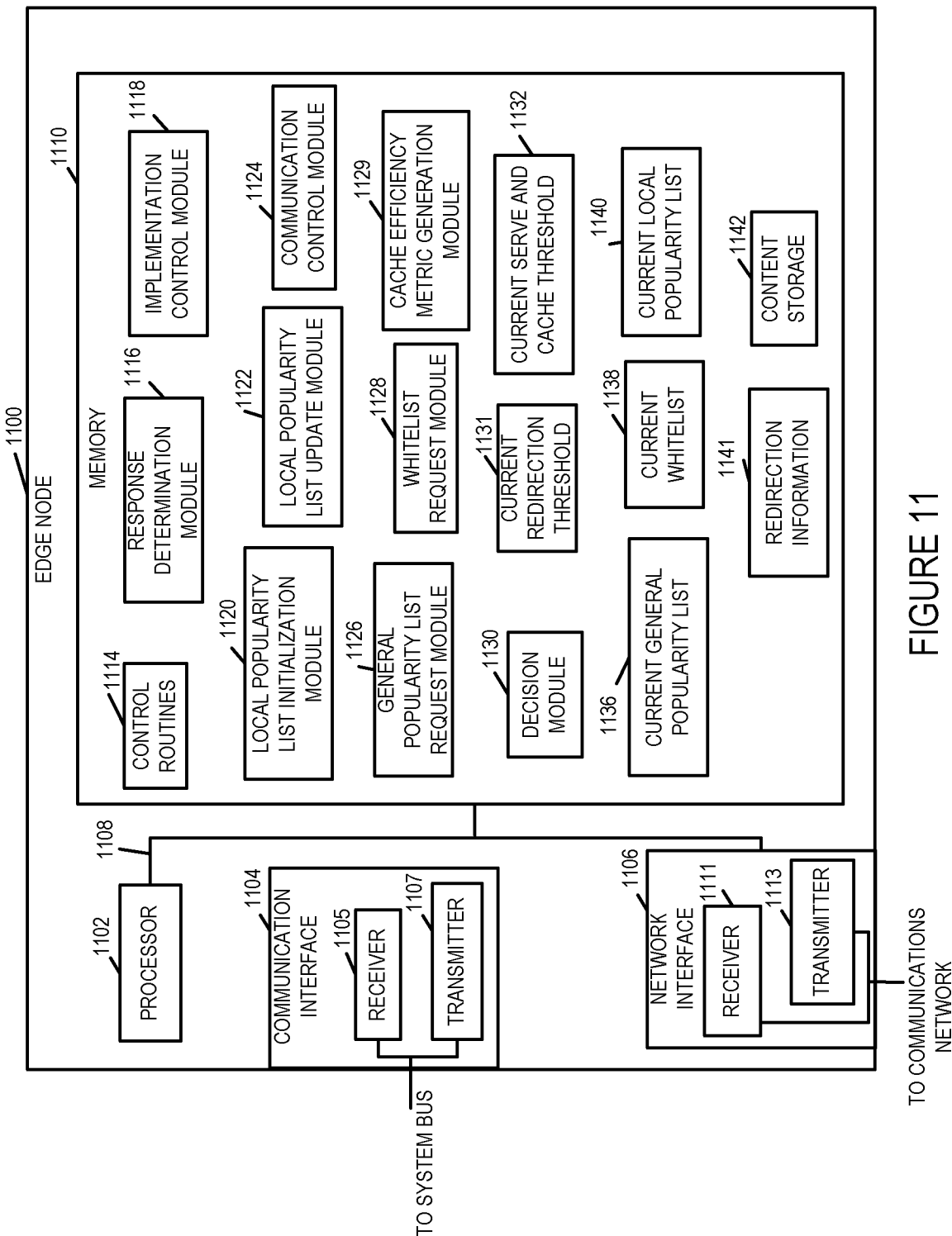
FIG. 11 shows an exemplary edge node which can be operated in accordance with the present invention to serve content in response to content requests received from one or more customer premise devices, e.g., playback devices, located at customer premises served by the edge node.

FIG. 11 shows an exemplary edge node which can be operated in accordance with the present invention to serve content in response to content requests received from one or more customer premise devices, e.g., playback devices, located at customer premises served by the edge node.

The exemplary first node 1100 which may be used as any of the edge nodes of FIG. 1, in accordance with an exemplary embodiment of the invention. The exemplary first node 1100 in some embodiments is used to implement the method shown in FIGS. 7-10.

As illustrated, the edge node 1100 includes a processor 1102, a communications interface 1104, a network interface 1106 and a memory 1111. The processor is configured to control the edge node to implement the methods and steps shown in the previous figures which are performed by edge node 118. The processor sometimes includes logic or dedicated circuitry for this purpose. Thus the processor may and in some embodiments does include a circuit for controlling the edge node to implemented each of the steps of the method performed by the edge node. The various components of the first node 1100 are coupled together via bus 1108 which allows for data to be communicated between the components of the first node 1100. The memory 1111 includes various modules, e.g., routines, which when executed by the processor 1102 control the first node 1100 to implement the methods of the present invention.

The processor 1102, e.g., a CPU, executes routines 1114 and uses the various modules to control the first node 1100 to operate in accordance with the invention. The processor 1102 is responsible for controlling the overall general operation of the first node 1100. In various some embodiments the processor 1102 is configured to perform functions that have been discussed as being performed by the first node.

Via the communications interface 1104, the first node 1100 is coupled to the various other nodes, servers and devices such as the control node 114, e.g., via the network/bus 152. The communications interface 1104 includes a receiver 1105 and a transmitter 1107 using which the first node may communicate, exchange signals and/or information with some of the other devices shown in system 110. In some embodiments via the communications interface 1104 the first node 1100 receives a general/global popularity list 1136 from the control node 114. In some embodiments via the communications interface 1104 the first node 1100 further receives a current white list 1138 from the control node 114.

Via the network interface 1106 the first node 1100 communicates and/or receives signals and/or information (e.g., including content requests) to/from various customer devices over a communications network, e.g., such as communications network 161. The network interface 1106 includes a receiver 1111 and a transmitter 1113 via which the receiving and transmitting operations are performed. In some embodiments the first node receives one or more content request from customer devices via the network interface 1106 and may also provide content to the customer devices via the network interface 1106.

The memory 1110 includes control routines 1114, a response determination module 1116, an implementation control module 1118, a local popularity list initialization module 1120, a local popularity list update module 1122, a communications control module 1124, a general/global popularity list request module 1126, a white list request module 1128, a cache efficiency metric generation module 1129 and a decision module 1130. Stored information in memory 1110 includes a current redirection threshold 1131, a current serve and cache threshold 1132, a current general popularity list 1136, a current white list 1138, a current local popularity list 1140, redirection information 1141 and stored content 1142.

The control routines 1114 include device control routines and communications routines to control the operation of the edge node 1100. The response determination module 1116 is configured to determine a response to be taken in response to a received request for content based on local popularity of the requested content. In some embodiments the response to be taken is one of: i) a cache and serve response action, ii) a serve but don't cache response action or ii) a redirect content request action. In some embodiments the response determination module 1116 checks the global popularity list 1136, the current local popularity list 1140, the current redirection threshold 1131 and the current serve and cache threshold 1132 in order to determine a response to be taken in response to each received content request. In some embodiments the response determination module 1116 is configured to determine a response to be taken in response to a received request for content based on a redirect threshold 1131. In some embodiments for content requests corresponding to content having a popularity on the local content popularity list 1140 below the redirect threshold 1131 the response determination module 1116 is configured to determine the redirect content request action as the response to be taken. In some embodiments the response determination module 1116 is configured to determine the response to be taken based on a serve and cache threshold 1132. In some embodiments for content requests corresponding to content having a popularity on a local content popularity list above the serve and cache threshold 1132 the response determination module 1116 is configured to determine the cache and serve action as the response to be taken. In some embodiments for content requests corresponding to content having a popularity on a local content popularity list at or below the serve and cache threshold 1132 and above the redirect threshold 1131 the response determination module 1116 is configured to determine the serve but not cache action as the response to be taken. In some embodiments the response determination module 1116 is configured to determine that the content requested by said request for content is not on a white list of content (e.g., white list 1138) which is to be served and cached irrespective of local popularity, prior to determining the response to be taken in response to a request for content based on the local popularity of the requested content.

The implementation control module 1118 is configured to implement the determined response to be taken, e.g., by controlling the first node 1100 to provide content and/or redirect in accordance with the response determination performed by the response determination module 1116 as discussed above.

The local popularity list initialization module 1120 is configured to initialize local content popularity information using content popularity values obtained from the general content popularity information, e.g., in the received general popularity list 1136 from the control node. The local popularity list includes a list of content items and their corresponding locally determined popularities. In some embodiments the local popularity list generation module 1120 is configured to generate the local popularity list based on the content popularity values obtained from the received general content popularity list 1136 information.

The local popularity list update module 1122 is configured to update a local popularity list generated by the module 1120 based on requests for content received by the first node in order to keep the local popularity information current thereby keeping the popularity list 1140 current. In some embodiments the receiver 1111 is configured to receive updated general content popularity information, e.g., from the control node. The local popularity list update module 1122 in some embodiments is configured to update the local content popularity information based on information included in the received updated general content popularity information. The local popularity list update module 1122 in some embodiments is configured to update the local content popularity information based on requests for content received by the first node at a faster rate than a rate of updating the local content popularity information based on updated general content popularity information. In some embodiments the local popularity list update module 1122 updates the local popularity list periodically or based on a predetermined schedule. Thus in some embodiments once a local popularity list is generated by the module 1120, the local popularity list update module 1122 updates the popularity information included in the generated local popularity list based on requests for content received by the first node, e.g., in a given time interval, and/or in the manner discussed above.

The communications control module 1124 is configured to control communications of information from the first node 1100 to other devices in the system 110, e.g., via the interfaces 1104 and/or 1106. The communications control module 1124 is configured to report, e.g., send a generated local popularity list and/or information to the control node 114, e.g., in response to a request from the control node 114 or without a request based on a schedule. The general popularity list request module 1126 is configured to generate a popularity list request message requesting a current general popularity list from the control node 114. In some embodiments the communications control module 1124 is configured to send the popularity list request message to the control node via the interface 1104. The white list request module 1128 is configured to generate a white list request message requesting a current white list from the control node 114. In some embodiments the communications control module 1124 is configured to send the white list request message to the control node 114 via the interface 1104. In some embodiments the white list request module 1128 requests updated white list and/or update information to update an existing received white list from the control node 114.

The cache efficiency metric generation module 1129 is configured to generate a cache efficiency metric based on a number of received content requests in a time period which can be served by already cached content relative to a number of content requests received in the time period which can not be served by already cached content. The decision module 1130 is configured to make a decision whether to modify a local popularity threshold used in making the response determination based on the generated cache efficiency metric.

The current general popularity list 1136 as the name indicates is the most current general popularity list available for use by the first node at a given time. Depending on the time the current general popularity list 1136 may include popularity information list received from the control node or maybe an updated version of that popularity list resulting from an update. The current white list 1138 is the most recently received white list from the control node. The current local popularity list 1140 includes the most current/updated local popularity information from the perspective of the first node 1100. The redirection information 1141 includes information indicating identifiers and/or address of network nodes, e.g., alternate server nodes, to which content requests may be redirected in accordance with the features of the invention. The redirection information 1141 may be in the form of a look-up table with information that can be used to redirect request for content to the identified in the redirection information 1141. The content storage 1142 includes content stored at the first node which can be supplied to customer devices.

In some embodiments the modules shown in FIG. 11 are, implemented as software modules. In other embodiments the modules are implemented in hardware, e.g., as individual circuits with each module being implemented as a circuit for performing the function to which the module corresponds. In still other embodiments the modules are implemented using a combination of software and hardware.

While shown in FIG. 11 example to be included in the memory 1110, the modules shown included in the first node 1100 can, and in some embodiments are, implemented fully in hardware within the processor 1102, e.g., as individual circuits. The modules can, and in some embodiments are, implemented fully in hardware, e.g., as individual circuits corresponding to the different modules. In other embodiments some of the modules are implemented, e.g., as circuits, within the processor 1102 with other modules being implemented, e.g., as circuits, external to and coupled to the processor 1102. As should be appreciated the level of integration of modules on the processor and/or with some modules being external to the processor may be one of design choice. Alternatively, rather than being implemented as circuits, all or some of the modules may be implemented in software and stored in the memory 1110 of the node 1100, with the modules controlling operation of the first node 1100 to implement the functions corresponding to the modules when the modules are executed by a processor, e.g., processor 1102. In still other embodiments, various modules are implemented as a combination of hardware and software, e.g., with another circuit external to the processor providing input to the processor 1102 which then under software control operates to perform a portion of a module's function.

While shown in the FIG. 11 embodiment as a single processor, e.g., computer, it should be appreciated that the processor 1102 may be implemented as one or more processors, e.g., computers. When implemented in software the modules include code, which when executed by the processor 1102, configure the processor 1102 to implement the function corresponding to the module. In embodiments where the various modules shown in FIG. 11 is stored in the memory 1110, the memory 1110 is a computer program product comprising a computer readable medium comprising code, e.g., individual code for each module, for causing at least one computer, e.g., processor 1102, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 11 control and/or configure the first node 1100 or elements therein such as the processor 1102, to perform the functions of corresponding steps illustrated and/or described in the earlier discussed flowcharts which are performed as part of the exemplary method of operating the first node.

FIG. 12 illustrates a general popularity list including a list of content and corresponding popularity information arranged according to the order of the listed content's popularity. In some embodiments the exemplary popularity list 1200 is generated by the control node 104 based on local popularity information reported from multiple different edge nodes and communicated to one or more network nodes, e.g., edge nodes, for use in initializing or updating a local content popularity list used for making content request response decisions.

The general popularity list 1200 includes a list of content and their corresponding popularities determined at the system level, e.g., taking into consideration the popularity of the content at multiple edge nodes corresponding to region that is normally larger in size than the region served by edge node 118. Upon receipt from the control node 104 the general popularity list 1200 is stored in a first node, e.g., edge node 118, as the current general popularity list. In some embodiments the network nodes receiving the general popularity list 1200 initialize their own local popularity lists using the global popularity information in the list 1200 if they do not already have a populated local popularity list. Based on received requests the edge node updates it local popularity list and over time the popularity of a piece of content will normally diverge at the edge node from the general popularity level reflecting local content preferences.

The information in the exemplary general popularity list 1200 is illustrated in tabular form with the list being presented in ranked order with the most popular content at the top and having the highest popularity metric in column 1204 and the less popular content at the bottom of the lowest 1200 having the lower popularity metric values in column 1204.

As can be seen the first column 1202 of the popularity list 1200 includes content identifiers corresponding to different pieces of content as identified by title or another content identifier. Each piece of content identified by the content identifier may correspond to a TV program, movie or some other piece of content. The second column 1204 includes non-locally determined popularity ratings with each piece of content having its own specific popularity rating as indicated by the metric in column 1204 corresponding to the individual piece of content. In some embodiments the non-locally determined popularity rating of a piece of content indicates the popularity/demand of that individual piece of content as determined by the control node 104 based on request and/or other popularity information received from multiple edge nodes or regional control nodes.

The items in the list 1200 are arranged from top to bottom in a descending order of popularity with the most popular (highest popularity) item being on the top and the least popular on the bottom. The non-locally determined popularity level indicates how popular the content is, e.g., as evaluated by the control node 104 based on its overall popularity or demand across multiple regions. A higher popularity level number corresponding to a piece of content indicates a higher popularity/demand for that content.

For a better understanding consider that each row of the popularity list 1200 corresponds to a single different piece content. While "TITLE" is used as a content identifier a URL or some other unique value could be used as the content identifier in the popularity list The first row 1210 corresponds to a first piece of content as identified by the content identifier TITLE 1. The corresponding popularity rating in column 1204 of the popularity list 1200 indicates that TITLE 1 has a non-locally determined popularity level of "97" which is the highest popularity rating in the list 1200. Next consider row 1212 and the corresponding entries in columns 1202, 1204 which indicate that TITLE 2 has a non-locally determined popularity level of "91". Row 1214 indicates that TITLE 3 has a non-locally determined popularity level of "80". Row 1216 indicates that TITLE 4 has a non-locally determined popularity level of "73", row 1218 indicates that TITLE 5 has a non-locally determined popularity level of "50", row 1220 indicates that TITLE 6 has a non-locally determined popularity level of "45", row 1222 indicates that TITLE 7 has a non-locally determined popularity level of "42", row 1224 indicates that TITLE 8 has a non-locally determined popularity level of "35", . . . , row 1244 indicates that TITLE N-3 has a non-locally determined popularity level of "20", row 1246 indicates that TITLE N-2 has a non-locally determined popularity level of "17", row 1248 indicates that TITLE N-1 has a non-locally determined popularity level of "0" and row 1250 indicates that TITLE N has a non-locally determined popularity level of "0".

An edge node uses the popularity list 1200 to initialize its own local popularity table and to update its local popularity table for new content which was not previously included on the local popularity table. Thus a received popularity list 1200 maybe used to initialize a local popularity table but the local popularity table will be updated over time based on the local popularity and thus reflect local preferences and the popularity of content at a particular edge node.

FIG. 13 illustrates a local popularity list and two thresholds which maybe maintained by an edge node and used in making decisions on how to respond to a content request received by an edge node.

The exemplary local content popularity list 1300 maybe generated by a first node, e.g., edge node 118, in accordance with one exemplary embodiment, e.g., by starting with the general popularity list 1200 and updating it over time based on local popularity information. Thus in various embodiments the edge node uses the general popularity list 1200 as a starting point to initialize its own local popularity list and then updates the list 1200 based on locally determined popularity ratings corresponding to various content for which content requests are received at the edge node.

The local caching and serving decisions are based on the local popularities in the local popularity list 1300 at the given edge node which may differ from the average general popularities of content items (e.g., such as in the general popularity list 1200). This facilitates efficient use of the local cache and facilitates providing quick responses to requests for locally popular content which may not be highly popular in the larger area on which the general popularity metrics are determined. Such a use of local popularity information at the edge node allows for efficient caching and serving of content in a manner that provides good service at the local level which might not be provided if only general popularity information in the list 1200 was used.

As can be appreciated from the local content popularity list 1300 for many content items included in the list the popularity rating remains the same as in the general popularity list 1200 while for some other content items (e.g., see popularity level corresponding to TITLE 3, TITLE 6, and TITLE N-3 and TITLE N-2 in the local popularity list 1300 have changed). Thus while the locally determined popularity rating for many items in the exemplary local popularity list 1300 remains the same (or does not significantly change) from the general popularity ratings in general popularity list

1200, at least for some items the locally determined popularity will change over time as reflected in the exemplary list 1300.

As shown in row 1314 the locally determined popularity level corresponding to TITLE 6 has changed and increased to popularity level "78" (compared to non-locally determined popularity of 45 in the list 1200). Similarly as shown in row 1320 the locally determined popularity level corresponding to TITLE 3 has changed and decreased to popularity level "46" (compared to non-locally determined popularity of "80" in the list 1200), the locally determined popularity level corresponding to TITLE N-3 has changed and increased to popularity level "25" (compared to non-locally determined popularity of "20" in the list 1200) as shown in row 1344 and the locally determined popularity level corresponding to TITLE N-2 has changed and increased to popularity level "20" (compared to non-locally determined popularity of "17" in the list 1200) as shown in row 1346.

In accordance with one aspect of some embodiments the first node uses the generated local popularity list 1300 for determining an action to be taken in response to a received request for content, e.g., how best to serve the requested content by taking one of the following actions: i) a cache and serve response action, ii) a serve but don't cache response action or ii) a redirect content request action. In some embodiments the action to be taken is determined based on a redirect threshold ($T_R$) and/or a serve and cache threshold ($T_{SC}$). In the illustrated local popularity list 1300 the two thresholds are indicated by the dashed dark lines, with the serve and cache threshold ($T_{SC}$) shown at the boundary of rows 1318, 1320 and the redirect threshold ($T_R$) shown at the boundary of rows 1344, 1346. In accordance with one feature of some embodiments requests for content corresponding to content having a popularity on the local popularity list 1300 above the serve and cache threshold ($T_{SC}$) are responded to by caching and serving the requested content. Content requests below the redirect threshold will not be served and will be redirected, e.g., for service by the alternate server. In the example of FIG. 13 the redirect threshold $T_R$ is set at local popularity level of "20" resulting in content requests for content having a popularity on list 1300 below "20" being not locally served but redirected, e.g., to alternate server nodes. Furthermore in the example the serve and cache threshold $T_{SC}$ is set at local popularity level of "50" resulting in content requests for content having a popularity on list 1300 above "50" being locally served and locally cached at the serving edge node. In accordance with one aspect of some embodiments, the requests for content corresponding to content having a popularity on the local popularity list 1300 at or below the serve and cache threshold $T_{SC}$ and above the redirect threshold $T_R$ will be served by the edge node but the content will not be cached at the edge node for possible use in responding to future content requests. Thus the requests for content items between the threshold dashed dark lines (e.g., TITLE 3, TITLE 7, TITLE 8, . . . , and TITLE 25 in the example are served by the edge node but not cached). Furthermore in accordance with an aspect of some embodiments the requests for content corresponding to content having a popularity on the local popularity list 1300 above the serve and cache threshold $T_{SC}$ are responded to by the edge node by caching and serving the requested content (e.g., TITLE 1, TITLE 1, TITLE 6, . . . , and TITLE 5 in the example are served and cached by the edge node).

As should be appreciated, in various embodiments the decision as to whether to serve a content request from the edge node which received the request or to redirect the content request is based on the popularity of the content and not whether or not the content is present in the local cache at the time the request for the piece of content is received. Thus, in cases where the popularity of content has changed since the content was placed in the local cache of an edge node and/or the redirect threshold has changed, it is possible and sometimes happens that a request for a piece of content which is present in the local cache and being served from the edge node to a playback device at the time another request for the later request for the same content is received, will be redirected for service to the alternate serving node even while the serving of the requested content is ongoing or possible due to the content's availability in the local cache. This may occur in cases where the content is being served to a playback device because of an earlier request but the content is below the redirect threshold on the local popularity list at the time the later content request for the content is received from another playback device.

Thus it should be appreciated that in at least some embodiments the decision made by an edge node which receives a content request whether to serve or redirect a content request is independent of whether or not the requested content is present in the edge nodes local cache and is instead based on the local popularity ranking of the requested piece of content at the time the content request is received.

In various embodiments system elements described herein are implemented using one or more modules which are used to perform the steps corresponding to one or more methods of the present invention. Each step may be performed by one or more different software instructions executed by a computer processor, e.g., a central processing unit (CPU).

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine, e.g., computer, executable instructions, such as software, included in a machine, e.g., computer, readable medium used to control a machine, e.g., general purpose computer with or without additional hardware, to implement all or portions of the above described methods, e.g., in one or more nodes. The machine readable medium may be, e.g., a memory device, e.g., RAM, floppy disk, etc. Accordingly, among other things, the present invention is directed to a computer-readable medium including computer executable instructions for causing a computer, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of operating an edge node in a communications network, the method comprising:
receiving, at the edge node, a general content popularity list;
initializing local content popularity information in the form of a local popularity list using content popularity values obtained from said general content popularity list, said initializing including using, at the edge node, the general content popularity list as the local popularity list;

receiving, at the edge node, a request for content;

determining, by the edge node, a response to be taken, in response to the request for content, based on local popularity of the requested content, said step of determining a response to be taken including determining that requested content is below a threshold on the local popularity list; and implementing, by the edge node, the determined response to be taken, said determined response including serving the requested content without caching the requested content in a cache.

2. The method of claim 1, further comprising:

updating, at the edge node, the local content popularity list based on the request for content received by said edge node.

3. The method of claim 2, further comprising:

adding a piece of content, which was previously not available, to the local content popularity list; and using on the local popularity list, as a popularity metric for the piece of content added to the local popularity list, a popularity metric from the general popularity list.

4. The method of claim 3, receiving, at the edge node, updated general content popularity information; and updating the local content popularity list based on information included in the updated general content popularity information; and wherein updating, at the edge node, the local content popularity list is further based on requests for content received by said edge node and is performed at a faster rate than the updating of the local content popularity list based on updated general content popularity information.

5. The method of claim 1, wherein determining the response to be taken is further based on a redirect threshold, requests for content corresponding to content having a popularity on the local content popularity list below the redirect threshold being redirected.

6. The method of claim 5, wherein determining the response to be taken is also based on a serve and cache threshold, requests for content corresponding to content having a popularity on the local content popularity list at or below the serve and cache threshold and above the redirect threshold being responded to by serving but not caching the requested content.

7. The method of claim 6, further comprising:

generating a cache efficiency metric based on a number of received content requests in a time period which can be served by already cached content relative to a number of content requests received in the time period which can not be served by already cached content; and making a decision whether to modify a local popularity threshold used in making the response determination based on the generated cache efficiency metric.

8. The method of claim 1, wherein determining the response to be taken is further based on a serve and cache threshold, requests for content corresponding to content having a popularity on the local content popularity list above the serve and cache threshold being responded to by caching and serving the requested content.

9. The method of claim 1, further comprising:

prior to determining, by the edge node, the response to be taken, in response to a request for content based on the local popularity of the requested content, determining that the content requested by said request for content is not on a white list of content which is to be served and cached irrespective of local popularity.

10. A node in a communications network, comprising:

a receiver configured to receive a general content popularity list prior to receiving a request for content;

a processor configured to:

initialize local content popularity information in the form of a local popularity list using content popularity values obtained from said general content popularity list, said initializing including using, at the node, the general content popularity information as the local popularity list;

determine a response to be taken, in response to the request for content, based on local popularity of the requested content, said step of determining a response to be taken including determining that requested content is below a threshold on the local popularity list; and implement the determined response to be taken, said determined response including serving the requested content without caching the requested content in a cache.

11. The node of claim 10, wherein said processor is further configured to update the local content popularity list based on the request for content received by said edge node.

12. The node of claim 11, wherein said processor is further configured to:

add a piece of content which was previously not available, to the local content popularity list.

13. The node of claim 12, wherein said processor is further configured to:

use on the local popularity list, as a popularity metric for the piece of content added to the local popularity list, a popularity metric from the general popularity list.

14. The node of claim 13, wherein said processor is further configured to update the local popularity list based on requests for content received by said node at a faster rate than a rate of updating the local content popularity list based on updated general content popularity information.

15. The node of claim 10, wherein said processor is further configured to determine the response to be taken based on a redirect threshold, said processor being configured to control the node to redirect requests for content corresponding to content having a popularity on the local popularity list below the redirect threshold.

16. The node of claim 15, wherein said processor is further configured to determine the response to be taken based on a serve and cache threshold, said processor being configured to respond to requests for content corresponding to content having a popularity on the local popularity list at or below the serve and cache threshold and above the redirect threshold by controlling the node to serve but not cache the requested content.

17. The node of claim 16, wherein said processor is further configured to:

generate a cache efficiency metric based on a number of received content requests in a time period which can be served by already cached content relative to a number of content requests received in the time period which can not be served by already cached content; and make a decision whether to modify a local popularity threshold used in making the response determination based on the generated cache efficiency metric.

18. The node of claim 10, wherein said processor is further configured to determine the response to be taken based on a serve and cache threshold, said processor being configured to respond to requests for content corresponding to content having a popularity on the local content popularity list above the serve and cache threshold by controlling the node to cache and serve the requested content.

19. The-node of claim 10, wherein said processor is further configured to determine that the content requested by said request for content is not on a white list of content, which is to be served and cached irrespective of local popularity, prior to determining the response to be taken, in response to a request for content, based on the local popularity of the requested content.

* * * * *